(12) United States Patent
Alkemper et al.

(10) Patent No.: US 8,582,943 B2
(45) Date of Patent: Nov. 12, 2013

(54) SIDE-EMITTING STEP INDEX FIBER

(75) Inventors: Jochen Alkemper, Klein-Winternheim (DE); Bernd Hoppe, Ingelheim (DE); Bernd Schultheis, Schwabenheim (DE); Simone Monika Ritter, Mainz (DE); Inka Henze, Nieder-Olm (DE); Detlef Wolff, Oppenheim (DE); Axel Curdt, Schlangenbad (DE)

(73) Assignee: Schott AG, Mainz (DE)

( * ) Notice: Subject to any disclaimer, the term of this patent is extended or adjusted under 35 U.S.C. 154(b) by 151 days.

(21) Appl. No.: 12/867,735

(22) PCT Filed: Feb. 3, 2009

(86) PCT No.: PCT/EP2009/000702
§ 371 (c)(1), (2), (4) Date: Nov. 29, 2010

(87) PCT Pub. No.: WO2009/100834
PCT Pub. Date: Aug. 20, 2009

(65) Prior Publication Data
US 2011/0103757 A1    May 5, 2011

(30) Foreign Application Priority Data

Feb. 14, 2008  (DE) .......................... 10 2008 009 137
Feb. 14, 2008  (DE) .......................... 10 2008 009 139
Jul. 25, 2008  (DE) .......................... 10 2008 034 791

(51) Int. Cl.
*G02B 6/02*  (2006.01)
(52) U.S. Cl.
USPC .......................................................... 385/124

(58) Field of Classification Search
None
See application file for complete search history.

(56) References Cited

U.S. PATENT DOCUMENTS

| 4,234,907 | A | 11/1980 | Daniel |
| 4,466,697 | A | 8/1984 | Daniel |
| 5,226,105 | A | 7/1993 | Myers |
| 5,982,969 | A * | 11/1999 | Sugiyama et al. ............ 385/123 |
| 6,278,827 | B1 * | 8/2001 | Sugiyama et al. ............ 385/123 |
| 6,519,401 | B1 * | 2/2003 | Imamura et al. ............. 385/123 |
| 7,082,721 | B2 * | 8/2006 | Whitehead .................. 49/490.1 |
| 8,218,938 | B2 * | 7/2012 | Ho ................................ 385/147 |

(Continued)

FOREIGN PATENT DOCUMENTS

| DE | 10245987 | 5/2004 |
| DE | 10344207 | 12/2004 |

(Continued)

OTHER PUBLICATIONS

English Translation of Notification of the First Office Action dated Nov. 24, 2011 corresponding to Chinese Patent Application No. 200980105142.1.

(Continued)

*Primary Examiner* — Sung Pak
(74) *Attorney, Agent, or Firm* — Ohlandt, Greeley, Ruggiero & Perle, L.L.P.

(57) ABSTRACT

Between core and cladding, the side-emitting step index fibers have scattering centers that ensure the coupling out of light from the fiber. The side-emitting step index fibers are produced by preforms that contain inlay rods, in which the scattering centers are embedded and which are applied to the outer region of the fiber core during fiber drawing. Alternatively, at least one inlay tube can be used.

16 Claims, 13 Drawing Sheets

(56) References Cited

U.S. PATENT DOCUMENTS

| | | |
|---|---|---|
| 2003/0128944 A1 | 7/2003 | Skutnik |
| 2005/0074216 A1 | 4/2005 | Irie |
| 2007/0281155 A1 | 12/2007 | Tao et al. |
| 2008/0019659 A1 | 1/2008 | Tao et al. |

FOREIGN PATENT DOCUMENTS

| | | |
|---|---|---|
| DE | 10344205 | 9/2005 |
| DE | 102005063208 | 7/2007 |
| EP | 0800036 | 10/1997 |
| EP | 0895104 | 2/1999 |
| EP | 1105673 | 6/2001 |
| EP | 1319636 | 6/2003 |
| EP | 1705157 | 9/2006 |
| JP | 57207204 | 12/1982 |
| JP | 63-199303 A | 8/1988 |
| JP | 1-109303 A | 4/1989 |
| JP | 9258028 | 10/1997 |
| JP | 1184136 | 3/1999 |
| JP | 2000137119 | 5/2000 |
| LV | 11644 | 4/1997 |
| WO | WO2006/124548 | 11/2006 |
| WO | WO2008/024397 | 2/2008 |

OTHER PUBLICATIONS

English Translation of International Preliminary Report corresponding to International application No. PCT/EP2009/000702 dated Aug. 26, 2009.

Written Opinion corresponding to International application No. PCT/EP2009/000702 dated May 14, 2009.

English Translation of Notification of the First Second Office Action dated Sep. 5, 2012 corresponding to Chinese Patent Application No. 200980105142.1.

Japanese Office Action dated Sep. 25, 2012 in corresponding to Japanese Patent Application No. 2010-546237 with English translation.

English translation of Third Chinese Office Action dated Apr. 3, 2013 in corresponding Chinese Patent Application No. 200980105142.1.

* cited by examiner

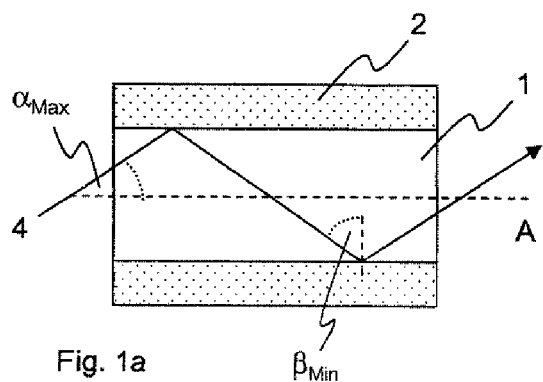 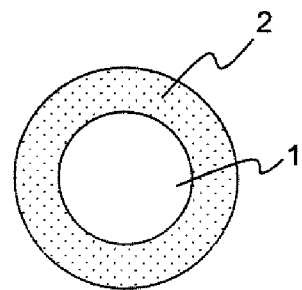
Fig. 1a    Fig. 1b
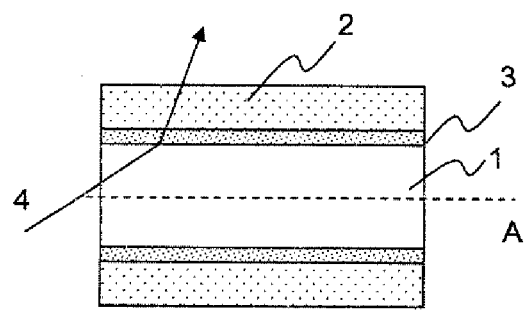 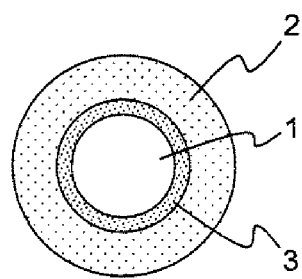
Fig. 2a    Fig. 2b
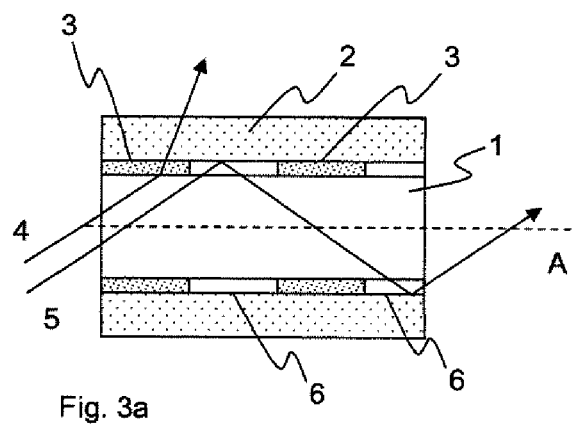 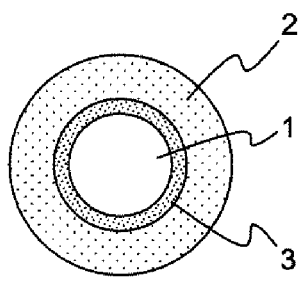
Fig. 3a    Fig. 3b

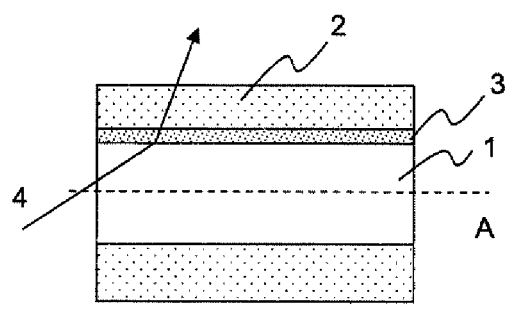 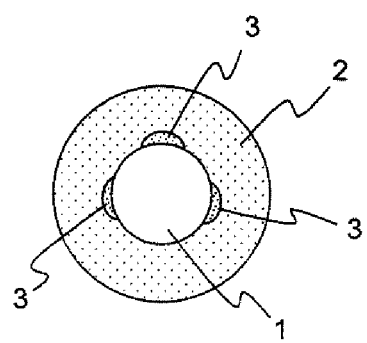
Fig. 4a Fig. 4b
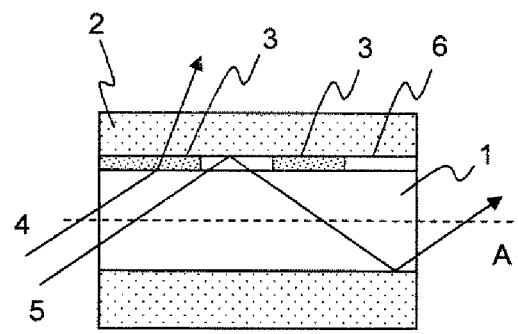 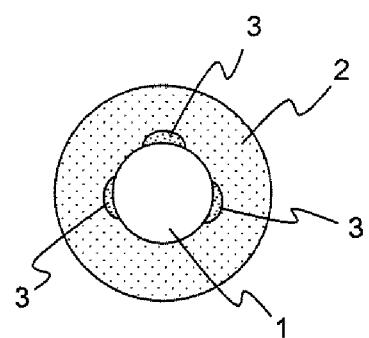
Fig. 5a Fig. 5b

SIDE-EMITTING STEP INDEX FIBER

CROSS REFERENCE TO RELATED APPLICATIONS

This application is a U.S. National Stage Entry under 35 U.S.C. §371 of International Application No. PCT/EP2009/000702, filed on Feb. 3, 2009, which claims the benefit of German Patent Application No. 10 2008 034 791.4, filed Jul. 25, 2008, German Patent Application No. 10 2008 009 139.1, filed Feb. 14, 2008, and German Patent Application No. 10 2008 009 137.5, filed Feb. 14, 2008, the entire contents of each of which are incorporated herein by reference.

BACKGROUND OF THE INVENTION

1. Field of the Invention

The invention relates to side-emitting step index fibers, methods for producing such, and their applications.

2. Description of Related Art

Step index fibers are understood as light-guiding fibers, the light being guided in the fiber core by total reflection of the light guided in the core at the cladding enclosing the fiber core along the fiber axis. The total reflection occurs whenever the cladding has a lower refractive index than the fiber core guiding the light. However, the condition of total reflection is possible only up to a limiting angle of the light striking the cladding, which angle is a function of the refractive indices of core and cladding. The limiting angle $\beta_{Min}$, that is to say the smallest angle at which total reflection still occurs, can be calculated by $\sin(\beta_{Min})=n_2/n_1$, with $\beta_{Min}$ being measured from a plane perpendicular to the fiber axis, $n_1$ representing the refractive index of the fiber core, and $n_2$ representing the refractive index of the cladding.

In general, the goal is to guide the light in the fiber as well as possible, that is to say as little light as possible is to be lost during coupling into the fiber and during transport in the fiber. The side-emitting step index fiber is a step index fiber in the case of which light is intentionally coupled out of the fiber core and of the fiber. What is desired in general is a uniform coupling out that, in the ideal case, makes a side-emitting step index fiber appear as a uniformly, luminous band or line. This renders it of interest for multiple applications, particularly in lighting engineering.

In the sense of the invention, side-emitting means that the fiber is capable of emitting light laterally irrespective of whether it is in operation, that is to say whether a light source is actually connected and the light is switched on.

As is generally known, the fibers are produced with the aid of fiber drawing processes in which at least the preform of the fiber core is heated up to or in excess of the softening temperature of material of the preform or the fiber core, and a fiber is drawn out. The principles of the fiber drawing process are described in detail in, for example, German patents DE 103 44 205 B4 and DE 103 44 207 B3.

Various methods are known from the prior art for producing the effect of side emission. One known method is to ensure coupling out of light in the fiber core.

Japanese laid-open application JP 9258028 A2 discloses side-emitting step index fibers in the case of which the light is to be coupled out by a non-round core. The coupling out is performed when light strikes the interface between fiber core and cladding at angles that are smaller than the limiting angle of total reflection $\beta_{Min}$. The non-round core geometries described, for example square, triangular or star-shaped, produce in the core geometric regions in which light otherwise guided by total reflection can be coupled out. The production of side-emitting fibers via such core geometries is, however, attended by the problem that coupling out the light is very inefficient in this case. The light is guided in the fiber to the cladding at essentially very flat incident angles, and the described core geometries extend along the fiber axis. Consequently, there are scarcely any areas where $\beta_{Min}$ is undershot. Furthermore, making use of the core geometries disclosed in JP 9258028 A2 for fibers made from glass is very complex because it is very difficult to produce appropriate preforms such as are required for fiber drawing. Moreover, precisely in the case of glass fibers the ultimate strength of such fibers is greatly reduced with non-round fiber core diameters. Presumably for this reason, this publication also discloses only fibers made from polymers.

A further method for coupling light out of the fiber core is described in U.S. Pat. No. 4,466,697, according to which particles that reflect and/or scatter light are mixed in the fiber core. There are difficulties here in producing relatively long fibers with uniformly side-emitting properties, since the guiding of light in the core is reduced by absorption by the added particles in the core, since there are no particles that scatter completely, but only ones that scatter nearly all the incident light. Because in the case of particles distributed uniformly in the core there is a very high probability that the light guided in the core will strike such particles, the probability of absorption is also very high even when the total number of particles is small. The coupling-out effect can therefore be scaled only with great difficulty, and this renders reproducible results in fiber drawing a matter of extreme complexity extending as far as near impossibility at least for fibers over 3 m in length, at least when the aim is to produce glass fibers.

Scalability in the sense of the present disclosure is understood as the capacity for targeted setting of the side-emission effects over the length of the fiber. This is required because fiber lengths can vary very strongly for different applications, whereas the aim is to attain the most uniform intensity possible for the emission of light over the entire fiber length.

As an alternative to coupling the light directly out of the fiber core, side-emitting properties can also be caused in the case of fibers by effects in the interface between fiber core and cladding or in the cladding itself. Thus, it is known from the prior art that crystallization reactions between core glasses and cladding glasses are undesirable, since the crystallites in the interface between core and cladding can serve as scattering centers such that light is coupled out of the fiber and therefore reduces its optical conductivity. This effect is generally undesirable in the case of optical waveguides and, as described in German patent DE 102 45 987 B3, glass fibers are normally developed in a targeted way such that no crystallization takes place between core and cladding. However, it would be conceivable to make targeted use of crystallization between core and cladding so as to produce side-emitting properties. Crystallization occurs during fiber drawing when core and cladding fuse with one another and the fiber cools down again. However, it has emerged in experiments that the crystallization process can be set and controlled during fiber drawing only with difficulty, and so there has so far been no success commercially with a reproducible and scalable production of side-emitting glass fibers whose side-emitting properties are based on the presence of crystallites in the interface between core and cladding.

In order to produce side-emitting properties based on scattering centers in the interface between core and cladding, it is proposed in accordance with patent specification LV 11644 B for silica glass fibers to apply to the drawn out silica glass fiber a coating that contains scattering particles. The outer protective cladding around the silica glass fiber can be applied subsequently. As is customary with silica glass fibers, the coatings both of the scattering layer and of the outer cladding consist of plastics. This has the disadvantage that the drawn out fiber core has to be subjected to further coating steps and is unprotected throughout this. Dirt particles deposited between core and coating lead to possible breaks and/or to points with strong coupling out of light. In any case, silica glass fibers as such are already extremely expensive because of the material, but the complicated fabrication method required in this publication renders them yet more expensive in addition.

US 2005/0074216 A1 discloses a side-emitting fiber having a transparent core made from plastic that firstly has a transparent first cladding and there after a second cladding, the two likewise being made from plastic. Scattering particles are embedded in the second cladding, which is the outer cladding. This method is possible only for fibers with very large fiber diameters of 4 mm or more, because the light guided in the fiber core must be coupled out by the inhomogeneities necessarily present at the very large interface between core and first cladding. The second cladding with the embedded scattering particles serves in this case to homogenize the coupled-out light over all solid angles. However, fibers having such large core diameters are less flexible and can therefore be laid only with difficulty. Such embodiments can be produced from glass only as rigid light-guiding rods and are completely inflexible.

A severe disadvantage of all solutions described that include plastic is, furthermore, that all of the plastic claddings described are flammable. Consequently, such fibers should be generally undesirable. Apart from this, they cannot be allowed at least in areas having more stringent fire protection regulations for example inside aircraft cabins.

Glass fibers as such are not flammable. Side-emitting glass fibers are, however, likewise already known. The established method for producing glass fibers having side-emitting properties provides for the preform of the fiber core to be roughened by grinding or sandblasting. These treatment processes produce structures on the peripheral surface of the fiber core that project into the fiber core and are intended to couple out the guided light. It has emerged here, as well, that the process for producing the side emission is inefficient and also scalable only with difficulty. Moreover, the treatment of preforms, in particular when these consist of glass, is often expensive and complicated. Moreover, the structures projecting into the fiber core constitute instances of damage to the fiber core that can give rise to load peaks and therefore to cracks in the event of bending loads, the result being that such fibers suffer from a reduced ultimate strength. For this reason, as well, this technique seems in need of improvement.

BRIEF SUMMARY OF THE INVENTION

Against this background, it is an object of the invention to provide a side-emitting step index fiber that can be produced economically and couples the light out laterally in an efficient fashion, the aim being for the effect to be easily scalable, and which is, moreover, not flammable. A further object of the invention is to provide a method for producing such side-emitting fibers, as well as fiber bundles including such side-emitting fibers and applications thereof.

An inventive side-emitting step index fiber includes a light-guiding core made from a glass with the refractive index $n_1$, and a transparent and/or translucent cladding that is made from a glass with the refractive index $n_2$ and encloses the core along the fiber axis, in which case located between core and cladding is at least one scattering region that is formed from a glass that substantially has the same refractive index $n_3$ and in which there are embedded scattering centers, the refractive index $n_3$ of this glass differing substantially from the refractive index $n_2$ of the cladding glass.

An inventive side-emitting step index fiber can be flexible or else rigid.

As is usual with fibers, the cladding completely encloses both the core but also the scattering region or regions along the fiber axis. The scattering region or regions therefore lie on the surface of the fiber core in a fashion protected by the cladding.

In the case of the present invention, the effect of the side emission is produced by scattering of the light guided in the core in a region between core and cladding that is thin in relation to the core diameter. To this end, a scattering region in which the scattering takes place is located between core and cladding in direct contact between the two. Responsible for the scattering are scattering centers that are embedded in the scattering region. In the meaning of the invention, scattering centers are all particles and/or material agglomerations and/or inhomogeneous regions, irrespective of shape, material and/or size, that can scatter the guided light. The scattering centers can develop their scattering action by means of classical scattering, in particular Rayleigh and/or Mie scattering, as well as by diffraction and/or reflection including multiple processes of these mechanisms among one another. Their function is merely to deflect light striking individually or in sum.

The coupling-out behavior of the side-emitting step index fiber can be adapted to the respective requirements by suitable selection of the value of the refractive indexes $n_1$, $n_2$ and $n_3$. The embedding of the scattering centers in a matrix made from glass is therefore also necessary in the sense of the invention in order to be able to apply them at all to the core in an economic way. The refractive index $n_2$ of the cladding glass preferably differs from that of the glass in which the scattering centers are embedded. Consequently, the refractive index $n_3$ differs substantially from $n_2$.

The greatest effects of side emission can be attained when there is located between core and cladding at least one scattering region that entirely encloses the core along the fiber axis. This means that the scattering region extends over the entire peripheral surface of the fiber core. In this case, for its part the cladding preferably encloses, in turn, the entire structure composed of core and scattering region. In this embodiment, the scattering centers are preferably distributed homogeneously in the scattering region. Such a scattering region in the meaning of the invention is produced as the fiber is being drawn by the fusing of a plurality of inlay rods that consist of a glass material in which the scattering centers are embedded. The drawing method and the inlay rods are explained in more detail in conjunction with the description of the preform and of the inventive production method. It is possible to dispense with the use of a tube for producing the preform used for fiber drawing for the scattering region owing to the use of the inlay rods and the resulting formation of a scattering region closed around the core by fusing of inlay rods. This is advantageous because there is thus no need to produce this preform by drawing tubes of a glass in which scattering centers are embedded. The use of a glass tube with embedded scattering centers is, nevertheless, possible as an alternative covered by the invention, but it can be more expensive than the production variant via inlay rods, because there would be a need for a tube drawing plant exclusively for the production of these preforms provided with scattering particles by virtue of the fact that scattering centers would usually be undesirable in tube drawing plants also used for customary glass tubes, and their addition would contaminate the entire plant in the example of scattered particles as scattering centers. The inventive side-emitting fiber can be produced in a particularly economic fashion by dispensing with such a tubular preform.

A further preferred embodiment provides that located between core and mantel is at least one scattering region that encloses the entire periphery of the core in a subregion along the fiber axis.

This means, in other words, that the scattering centers are embedded only in parts of the matrix glass, these parts enclosing the core in an annular fashion. If the spacing between regions in which scattering centers are present and ones that have no scattering centers is sufficiently large, it is possible to produce in a targeted fashion a side-emitting fiber that exhibits the emission effect in a number of regions and does not do so in other regions. Such a fiber can be advantageous in order to attain an appropriate design effect, or else firstly to lead the light with as little loss as possible through the region without the side-emission effect to the location at which the side emission is to take place. This enables the separation of light source that is to be coupled into the fiber, and the lighting location. Fibers of this type can be produced when use is made of inlay rods or glass tubes in which scattering centers are embedded only in subregions along the axis thereof. However, during fiber drawing the region of the inlay rods and/or glass tubes that is not doped with scattering centers also fuses with the fiber core such that the amount of the sum of the core diameter and thickness of the scattering region without embedded scattering centers and with embedded scattering particles preferably remains essentially the same over the entire fiber length.

In a particularly preferred embodiment, the side-emitting step index fiber has at least one discrete scattering region between core and cladding that extends on a subregion of the core periphery along the fiber axis. This means that in this case at least one scattering region extends along the fiber axis or subregions of the fiber axis but does not enclose the fiber entirely. Such scattering regions can be produced when the inlay rods do not fuse with one another at all, or do so incompletely, during fiber drawing. The production of such discrete scattering regions can be set by the number and/or the diameter and thus the volume of the inlay rods used. It follows that in this embodiment there exists on the peripheral surface of the core at least one region that extends along the fiber axis and is also not occupied by the material in which the scattering centers are otherwise embedded. However, it is also possible, of course, that, as described with reference to the preceding embodiment the discrete scattering region(s) extending along the fiber axis has/have regions along the fiber axis in which no scattering centers are embedded such that in this case the inventive fiber does not exhibit the side-emission effect over its entire length and so, by way of example, there is, in alternating fashion, a succession of regions with side emission and regions without side emission.

Coupling the light out of the side-emitting step index fiber can preferably be scaled by the number of the discrete scattering regions extending substantially along the fiber axis. Since what is desired as a rule is for light to be coupled laterally out of the fiber in an efficient fashion, a particularly preferred inventive side-emitting step index fiber between core and cladding has a plurality of discrete scattering regions that respectively extend on a subregion of the core periphery along the fiber axis. The number of the discrete scattering regions is preferably from 1 to 50, with particular preference from 1 to 10.

It is preferably possible either to embed scattering particles in the glass as scattering centers, or else to form the scattering centers by means of inhomogeneous regions of the glass in which they are embedded.

In the case of the use of scattering particles as scattering centers, it is preferred to use scattering particles whose melting temperature is higher than the melting temperature of the glass in which they are embedded. Because in this case at least the scattering properties of the scattering particles do not vary during the production process, selection of the scattering particles is facilitated and they can be purchased correspondingly as raw material.

The scattering particles preferably have a diameter of between 10 nm and 5000 nm, with particular preference of between 100 nm and 1200 nm. For non-round scattering particles, it is their maximum extent that is understood as diameter in the sense of the invention.

The scattering particles can be selected from a multiplicity of materials. They preferably consist essentially of $SiO_2$ and/or BaO and/or MgO and/or BN and/or AlN and/or SiN and/or $ZrO_2$ and/or $Y_2O_3$ and/or $Al_2O_3$ and/or $TiO_2$ and/or Ru and/or Os and/or Rh and/or Ir and/or Ag and/or Au and/or Pd and/or Pt and/or diamond-like carbon and/or glass-ceramic particles. Mixtures of scattering particles composed of various materials, compounds and/or conglomerates of these scattering particles, or else ones fused and/or sintered with one another are likewise also conceivable and covered by the invention as are likewise the metallic components of the abovenamed oxides and nitrides.

If scattering particles are used as scattering centers, $n_3$ preferably has approximately the same value as $n_1$ of the core glass. A refractive index $n_3$ of the matrix material in which the scattering particles are embedded that differs substantially from $n_1$ would have the result that the matrix material itself would cause effects influencing the light guidance in the core. If $n_3$ were, for example, substantially smaller than $n_1$, the light guided in the core would be reflected by the material of the matrix rather than by the scattering centers, and so only little down to no scattering could take place at the scattering centers. Such a fiber would couple out only a little light to the side. If, by contrast, the refractive index $n_3$ of the material of the matrix was substantially higher than $n_1$, the light guided in the core would reach the outside very quickly, and the fiber would lose its entire light intensity over a very short length such that only very short fiber lengths would be possible. If the refractive index $n_3$ of the matrix material of the scattering regions is, by contrast, substantially equal in this case to the refractive index $n_1$ of the core, the light guided in the core is at most subject to insubstantial interference by the matrix material, and so the light guided in the core can strike the scattering particles without being hindered by the matrix material. Efficient scaling of the side emission is thus possible via the selection of the concentration of the scattering particles in the scattering region.

Aside from depending on the scattering property of the scattering particles as intrinsic parameter, the efficiency with which light is coupled out of the scattering region and thus out of the fiber is also a function of the concentration of the scattering particles in the scattering region itself.

One embodiment of the invention therefore provides that the scattering centers are formed by scattering particles, the concentrations of the scattering particles in the scattering region being from 10 ppm to 1000 ppm, and preferably from 20 ppm to 100 ppm.

The stipulation of concentration in ppm relates in this case to the proportion of scattering particles in relation to the parts by mass of the components of the glass in which the scattering particles are embedded.

If inhomogeneous regions of the matrix glass of the scattering regions serve as scattering centers, this results in an alternative embodiment of the invention in which the inhomogeneous regions are preferably formed by phase separation and/or demixing of the glass components of the glass in which they are embedded.

The scattering centers formed by inhomogeneous regions preferably have a diameter of 10 nm to 1000 nm, with particular preference of 100 nm to 800 nm.

These scattering centers are particularly preferably spherical. For non-spherical scattering centers, their maximum extent is understood as diameter in the sense of the invention.

The glass in which the inhomogeneous regions are embedded as scattering centers can preferably consist of a silicate glass containing As and Pb. In this case, it is preferred for the scattering centers to have an increased content of Pb and/or As by comparison with the surrounding glass matrix.

Alternatively, the glass in which the inhomogeneous regions are embedded as scattering centers can consist of a fluorine-containing Ca—Zn silicate glass. The scattering centers then preferably have an increased content of fluorine by comparison with the surrounding glass matrix.

The refractive index $n_3$ of the glass in which the scattering centers are embedded is preferably higher than the refractive index $n_2$ of the cladding glass, that is to say the condition $n_3 > n_2$ is preferably fulfilled.

Moreover, it is particularly preferred for the refractive index $n_3$ of the glass in which the scattering centers are embedded to be at least equal to or greater than the refractive index $n_1$ of the core glass, that is to say it is particularly preferred for the condition $n_3 \geq n_1$ also to be fulfilled.

As in the case of the scattering particles, aside from being dependent on the scattering property of inhomogeneous regions themselves as intrinsic parameter, the efficiency with which light is coupled out of the fiber in the case of the inhomogeneous regions as scattering centers, as well, is also a function of the concentration of the inhomogeneous regions in the glass surrounding them. It has been established that concentrations of the inhomogeneous regions in the scattering region between 1% and 80% enable efficient coupling out, the preferred region being between 10% and 50%.

Here, the concentration given in % relates to the proportion of the inhomogeneous regions in relation to the percent by weight of the components of the glass in which the inhomogeneous regions are embedded.

Considered overall, the parameters with which the side-emission effect can preferably be set and thereby scaled are the number of the discrete scattering regions along the fiber axis, the scattering properties of the scattering centers used and the concentration thereof, as well as the selection of the refractive indices $n_1$, $n_2$ and $n_3$. By combining these parameters appropriately, it is possible to produce side-emitting fibers of very different length that appear largely homogeneous to the human eye such that a multiplicity of applications are rendered possible for the very first time.

Aside from the efficiency and homogeneity of the side emission, the inventive side-emitting step index fibers must, however, also withstand mechanical loads as well as possible. If the fibers are excessively sensitive mechanically, it is easy for fiber breakages to occur that can render the fiber useless. In particular, the inventive fibers must be able to be repeatedly bent without breaking. One criterion for assessing the ultimate strength of fibers is the so-called loop test. In this case, a loop that is tightened is formed from a fiber. The smaller the diameter of the loop at which the fiber breaks, the more it is resistant to fracture.

Appropriate ultimate strengths can be produced by means of pretensioned fibers. For the inventive fibers, this means that the coefficient of thermal expansion of the core glass is preferably larger than the coefficient of thermal expansion of the cladding glass. The other way round, this means that the cladding glass preferably has a smaller coefficient of thermal expansion and a higher glass transition temperature $T_g$ than the core glass. Owing to the fact that the cladding glass has a higher glass transition temperature relative to the core glass, during drawing of the fiber the cladding glass cools more quickly than the core glass and thus produces a stress in the glass fiber that stabilizes the glass fiber mechanically. Such prestressed fibers are generally substantially more fracture resistant than are non-prestressed fibers. Of course, other methods for producing the stress are also possible aside from the thermal prestressing described. For example, the fiber can also be prestressed chemically during the production process or thereafter. In this case, ions that would be responsible for producing the stress would preferably be introduced into the cladding by known processes for chemical prestressing.

In a preferred inventive side-emitting step index fiber, the diameter of the core is preferably 10 μm to 300 μm, the at least one scattering region having a thickness of 100 nm to 3 μm, and the cladding being between 500 nm and 15 μm thick. This holds irrespective of whether scattering particles or inhomogeneities are used as scattering centers.

If the side-emitting step index fiber is drawn out such that its diameter is approximately more than 0.5 mm, it is not flexible but rigid. It then represents a light-guiding rod, also termed single core rod.

Of course, the inventive side-emitting step index fibers are not used as individual fibers in most cases but together with other side-emitting step index fibers or together with other light-guiding fibers that have no side-emission effect, in fiber bundles that are therefore likewise covered by the invention.

For its part, such a fiber bundle is preferably surrounded by a protective outer cladding that consists of plastic in most cases. Said cladding can be extruded around the fiber bundle by known methods. It is likewise possible for fiber bundles or individual fibers to be laid tubewise in a cladding made from plastic. Such fibers can also be inserted in a type of cable channel individually, as bundles and/or as bundles provided with a protective cladding, it being possible, by way of example, for said cable channel to be produced from injection molded parts and to comprise a rectangular profile onto which a cover is clamped. The plastic is preferably transparent and/or translucent, at least in subregions.

As compared with an individual fiber having the same diameter, fiber bundles have the advantage that they are much more flexible and can be laid with smaller bending radii. Fiber bundles that include the previously described side-emitting step index fiber are likewise covered by the invention.

There is also no need for the fiber bundle necessarily to be flexible in the sense of the invention; it is likewise possible for the fiber bundle to be designed as a rigid fiber rod which is put into its final shape by later forming, for example bending and/or pressing. The fibers inside the fiber rod preferably have a diameter of 10 μm to 300 μm. Unlike the previously described light-guiding rod, a fiber rod includes a plurality of individual fibers and is therefore also referred to as a multi-core rod. The fiber rod itself can, furthermore, preferably be surrounded by a cladding glass and/or a cladding made from plastic, in order to protect the light-guiding fibers and/or the inventive side-emitting step index fibers, and/or to increase the surface quality of the fiber rod. In order to render the side-emission effect visible, the cladding glass and/or the plastic cladding around the fiber rod are/is preferably transparent and/or translucent, at least in subregions.

A flexible fiber bundle likewise covered by the invention includes a multiplicity of glass fibers and an external cladding entirely enclosing this multiplicity of glass fibers along the fiber bundle axis, the glass fibers including a multiplicity of the previously described inventive side-emitting step index fibers, and the outer cladding being transparent and/or translucent along the fiber bundle axis, at least in subregions. The transparency and/or translucency of the outer cladding is necessary so that the light emitted laterally by the individual fibers can also leave the fiber bundle and thereby become visible to the observer. If a translucent outer cladding is used instead of a transparent outer cladding, it is possible to homogenize the laterally emitting light of the individual fibers. Of course, this also holds for the light-guiding rod described.

An inventive fiber bundle can typically have from 100 to 10 000 individual fibers, the number being determined by the diameter of the fiber bundle and by the diameter of the individual fibers, a filling factor of 0.8 to 0.9 typically being taken into account.

In order to ensure very high demands with reference to the fire resistance of the fiber bundle, the outer cladding of the fiber bundle preferably consists of flame resistant plastics and/or of a tissue of glass fibers. However, it is likewise possible for the outer cladding to be produced by winding the multiplicity of glass fibers with one or a multiplicity of glass fibers. It is also possible to spin the individual fibers of the bundle with one another such that a type of rope and/or yarn results that no longer needs a separate cladding.

The invention renders it possible to provide side-emitting step index fibers having an efficient side emission and in the case of which the side-emission effect can also be very effectively scaled in accordance with the requirements, the result being that the quantity of light coupled out can be effectively set over the fiber length.

It is thereby possible for the inventive side-emitting step index fibers also to be joined together with other optical waveguides and/or other side-emitting step index fibers and/or textile fibers to form a sheet. A preferred form of application of the invention is thus a sheet including a plurality of inventive side-emitting step index fibers.

In the sense of the invention, a sheet is an object that has a large area in relation to its thickness. In this way, it is possible to produce on the basis of the inventive side-emitting step index fibers a luminous, flat sheet that can emit light in a fashion distributed homogeneously over the surface. Such a sheet is preferably configured such that a viewer perceives it as a homogeneously luminescent surface when the sheet is in operation, that is to say when light is coupled into the side-emitting step index fibers of the sheet.

In a preferred embodiment, the side-emitting step index fibers are arranged substantially parallel to one another in such a sheet. However, it is, of course, likewise possible to have side-emitting step index fibers that are otherwise arranged inside the sheet, in accordance with the emission characteristic Preference is given to a sheet in which the side-emitting step index fibers are fixed on a support element so as to form a compound element composed of support element and side-emitting step index fibers. The support element is preferably likewise planar, but can have any desired shapes and cambers. The support element can contribute to stabilizing the sheet.

Alternatively, a sheet is preferred in the case of which the side-emitting step index fibers are embedded in the support element so as to form a compound element composed of support element and side-emitting step index fibers.

This compound element can be produced by an injection molding process in which transparent plastic preferably constitutes an encapsulation of the light-guiding fibers and/or side-emitting step index fibers. Use may be made to this end of thermal plastics, for example polycarbonate, PVC, thermoplastic elastomers or silicones.

It is preferred, however, for the side-emitting step index fibers to be fixed on the support element by sewing and/or weaving. It is likewise possible also to sew the step index fibers to one another and/or to the support element. Both textile yarns and, once again, glass fibers can be used as sewing yarn.

The sheet can preferably also result from connecting the inventive side-emitting step index fibers to a suitable support element, for example by bonding, lamination—together with a foil, if appropriate—and/or other suitable methods.

It is particularly preferred for the support element of the inventive sheet on which and/or in which the side-emitting step index fibers are fixed to be transparent and/or translucent such that the light that can be emitted by the step index fibers can pass through the support element. The support element can be colored in order to attain color effects.

In order to stabilize the sheet further, a further preferred embodiment also provides that the compound element composed of support element and side-emitting step index fibers is connected to a stabilization element.

It is particularly preferred for the stabilization element to be arranged such that the side-emitting step index fibers are located between a surface of the support element and a surface of the stabilization element. The stabilization element can therefore also contribute to protecting the step index fibers. It is preferably arranged at the rear as a cover layer in the form of a foil or a rigid plate, the support element preferably being transparent and/or translucent.

In order to increase the light yield, the side of the support element and/or of the stabilization element that faces the side-emitting step index fibers is preferably designed such that it can reflect the light emitted by the side-emitting step index fibers. This means that the side of the support element or of the stabilization element that faces the step index fibers can be colored white, or is designed in a reflecting fashion. By way of example, this can be achieved particularly easily when aluminum foil is used as stabilization element. In this case, the support element preferably consists of a transparent and/or translucent plastic such as, for example, Plexiglas. Of course, it is also possible to connect further stabilization elements to the compound element.

For the purpose of coupling in light, the light-guiding fibers can be combined by means of bundling the optical waveguides, the optical waveguides being combined by means of ferrules and/or adhesive tapes, generally being bonded, and the terminal surfaces being ground and polished such that light can be coupled in optimally. For the purpose of increasing the luminescence of the emitting surface, the light-guiding fibers can also be combined at both ends such that light can be coupled in at both ends.

For the purpose of operating the inventive sheet, light can be coupled into the light-guiding fibers and thus into the side-emitting step index fibers. It is preferred to use as light source punctiform light sources that, for the purpose of optimum light yield, focus the light by means of auxiliary optics in such a way that the light is irradiated within the acceptance angle specific to the light-guiding fibers. LEDs, in particular, with particular preference white light LEDs or RGB LEDs are proposed for coupling in the light because of their compact design and relatively high light yield.

In order to be able to guide light into the inventive sheet, a sheet as described preferably has measures for the connection of at least one LED as light source.

It is particularly preferred for a sheet as described to have measures for connecting at least one LED to opposite edges of the sheet such that the light can be coupled into the end surfaces at both ends of the step index fibers.

Because the production of the scattering region in the inventive side-emitting fiber constitutes a severe problem, the preform that is used in the production method is likewise an essential part of the invention and covered thereby. The term "preform" is well known to the person skilled in the art in the field of fiber drawing. It comprises the structure from which the fiber is drawn. A conventional preform that is used to produce glass fibers without side-emitting properties generally comprises a core rod made from glass around which there is arranged coaxially a envelope tube made from a glass. The core rod can be produced by pouring the glass into a mold. By way of example, for the most part there is a need for reworking, for example by grinding or fire-polishing. The envelope tube can result from tube drawing. Methods for producing glass tubes are sufficiently well known. When the preform is drawn out to form the fiber, the envelope tube fuses with the core rod, the fiber core being formed from the core rod, and the cladding from the envelope tube. The fiber has a diameter that is smaller by a multiple than the preform, and it is possible in this way to draw fibers of many kilometers from a single preform.

An embodiment of the preform for producing a side-emitting step index fiber includes a core rod made from glass having the refractive index $n_1$, and an envelope tube made from a glass having the refractive index $n_2$, the envelope tube enclosing the core rod along the core rod axis, and wherein arranged between core rod and envelope tube in a fashion substantially parallel to the core rod axis is at least one inlay rod or else an inlay tube made from a glass that has substantially the refractive index $n_3$ and in which scattering centers are embedded. It is preferred for $n_2$ and $n_3$ to differ from one another.

The scattering regions are formed during fiber drawing from the inlay rods or the inlay tube. As described, the scattering centers can be formed by scattering particles or by inhomogeneous regions.

An inventive preform preferably has between core rod and envelope tube 1 up to 100 inlay rods that are arranged substantially parallel to the core rod axis. It is particularly preferred for there to be 1 to 50, 1 to 20, 1 to 10 and 1 to 5 inlay rods.

If the scattering regions resulting from the inlay rods are not fused with one another during fiber drawing, the number of the inlay rods corresponds to that of the discrete scattering regions on the core of the inventive side-emitting step index fiber. However, as already described, partial fusions or complete fusions are possible such that the number of the discrete scattering regions need not necessarily correspond to the number of the inlay rods in the preform.

The inlay rods can be arranged substantially with the same spacings from one another. However, the exact positioning of the inlay rods in the preform is not necessarily essential for the later appearance of the fiber bundle described, since inhomogeneities resulting from inaccurate positioning cancel one another out owing to the multiplicity of the side-emitting fibers present in the fiber bundle.

It is preferred to make use for the preform of inlay rods whose diameter is from 0.2 mm to 2 mm, particularly preferably 0.3 mm. This holds independently of the type of the scattering centers embedded in the glass of the inlay rods.

The diameter of the scattering centers in an inlay rod or inlay tube can preferably be from 10 nm to 2000 nm, particularly preferably between 100 nm and 1200 nm.

If use is made as scattering centers of scattering particles that are embedded in the material of the inlay rod or inlay tube, these preferably include $SiO_2$ and/or $SiN$ and/or $BaO$ and/or $MgO$ and/or $ZnO$ and/or $Al_2O_3$ and/or $AlN$ and/or $TiO_2$ and/or $ZrO_2$ and/or $Y_2O_3$ and/or the metals of these oxides alone and/or $BN$ and/or $B_2O_3$ and/or $Ru$ and/or $Os$ and/or $Rh$ and/or $Ir$ and/or $Ag$ and/or $Au$ and/or $Pd$ and/or $Pt$ and/or diamond-like carbon and/or glass-ceramic particles.

The concentration of the scattering particles in the at least one inlay rod or inlay tube is preferably between 10 ppm and 1000 ppm, with particular preference between 20 ppm and 100 ppm.

If inhomogeneous regions of the glass of the inlay rods or of the inlay tube are used as scattering centers, the concentration of the inhomogeneous region in the at least one inlay rod or inlay tube is preferably between 1% and 80%, with particular preference between 10% and 50% (in percent by volume).

The inhomogeneous regions of the inlay rod or inlay tube are preferably formed by phase separation and/or demixing of the glass components of the glass in which they are embedded. That is to say, it is possible by way of example for there to form in the glass having the refractive index $n_3$ droplet-shaped demixing zones having the refractive index $n_4$ that are formed from a part of the glass components of the basic glass having the refractive index $n_3$.

These demixing zones having the refractive index $n_4$ thus have a composition other than the glass having the refractive index $n_3$ and can thus also possess other physical properties, for example even another refractive index and/or another coefficient of expansion. The glass of the inlay rod or inlay tube in which the inhomogeneous regions are embedded as scattering centers preferably consist of an As—Pb-containing silicate glass. Such a glass is a silicate glass that includes Pb and As. In this case, the inhomogeneous regions can have an increased content of Pb and/or As by comparison with the surrounding glass matrix of the inlay rod or inlay tube.

Alternatively, the glass of the inlay rod or inlay tube in which the inhomogeneous regions scattered centers are embedded preferably consists of a fluorine-containing Ca—Zn silicate glass. The inhomogeneous regions can then have an increased content of fluorine by comparison with the surrounding glass matrix of the inlay rod or inlay tube.

In order to produce the inventive side-emitting step index fiber, at least one previously described preform is firstly produced as intermediate product. To this end, a core rod made from a glass having the refractive index $n_1$ is provided and at least one inlay rod made from a glass having the refractive index $n_3$ is arranged around the core rod in a fashion parallel to the core rod axis. The previously described scattering centers are embedded in the glass of the inlay rod and/or the inlay rods. The refractive index $n_3$ preferably differs from $n_2$. Arranged around core rod and inlay rods is an envelope tube made from a glass having the refractive index $n_2$ such that the core rod and the inlay rod and/or the inlay rods are located within the envelope tube. However, it is also possible to arrange the inlay rod(s) prior or subsequent to the arrangement of core rod and inlay rod in the interspace between core rod and envelope tube. The preform thus obtained is subsequently fastened in a heating unit, heated therein and drawn out to form a glass fiber in a way known to the person skilled in the art.

Instead of the inlay rod and/or the inlay rods, it is equally possible to proceed with one or more concentrically arranged inlay tube(s).

During fiber drawing, the core and the respective inlay rod or the respective inlay tube fuse at the interface between core and inlay rod or inlay tube. The inlay rod is also deformed in this case, that is to say if it had a round diameter in the preform it preferably forms a flat, slightly cambered region on the core peripheral surface after the fiber is drawn. If the scattering centers are embedded in this region, a scattering region extending along the fiber axis is thus produced. The scattering centers are distributed over specific regions of the core peripheral surface in this way, as it were. If a plurality of inlay rods fuse with one another, it is possible for the scattering region to enclose the entire periphery of the core of the fiber, that is to say its entire peripheral surface.

The temperature at which the fiber is drawn is termed the drawing temperature, and is above the softening temperature of the glass of which the envelope tube consists. It is customary to make use for the core of glasses that have a lower softening temperature than the glass of the envelope tube so that during heating in the heating unit a temperature is also reached in the core rod that is above the softening temperature of the glass of the core rod. Heating methods are, however, also known which enable the softening temperature of the core rod to be above that of the envelope tube. The drawing temperature is preferably also above the softening temperature of the highest-melting glass that is used in the preform. By setting the drawing temperature, the viscosity of the glass is influenced during the drawing of the fiber such that a fiber of desired thickness can be obtained by interaction with the drawing speed.

As previously described, the inlay rods and/or inlay tubes in which scattering particles are embedded as scattering centers preferably have the same refractive index as the core rod. This can be achieved most simply by using the same glass for core rod and inlay rods and/or inlay tubes. Deviations of the refractive indices of core rod and inlay rod and/or inlay tube, and thus of fiber core and matrix glass of the scattering region that can occur through variations in the production of the glass are, of course, likewise covered by the invention.

In order to obtain the abovementioned discrete scattering regions that extend along the fiber axis but do not completely enclose the core peripheral surface, it is envisaged in the inventive method that at least one inlay rod fuses with the core rod when the preform is drawn out. If use is made of more than one inlay rod, these are arranged such that they cannot fuse entirely with one another. However, it is also possible to arrange the inlay rods such that some of them fuse with one another, whereas others do not. In this way, it is possible to produce discrete scattering regions of different width along the fiber axis.

However, it is also possible for the aim to be to produce a scattering region that encloses the entire periphery of the core along the fiber axis. The scattering region, as it were, then occupies the entire core peripheral surface. This is achieved by the inventive method when a plurality of inlay rods are used and are arranged in the preform such that they fuse both with the core rod and with one another when the preform is drawn out. The thickness of the scattering region can be set in this case by the number and diameter of the inlay rods. However, this is also possible when an individual inlay rod has sufficient volume to enclose the core peripheral surface during fusing.

It is preferred to apply negative pressure to the preform when the fiber is being drawn out thereof, that is to say a pressure that is lower than the pressure of the medium surrounding the preform is produced in the interstices of the preform. This provides support during the drawing process to the application of the envelope tube or the cladding to the core rod or the fiber core and/or the inlay rods and/or inlay tubes and thus the scattering region(s). During drawing of the fiber, this aspect of the method supports the application of the cladding to scattering region and/or core and thereby contributes to avoiding undesired interstices in the drawn-out fibers.

In a preferred refinement of the inventive method, use is made for the envelope tube of a glass whose coefficient of thermal expansion is lower than the coefficient of thermal expansion of the core glass used. The core glass is the glass of which the core rod and thus the fiber core consist. As previously described, the result of this is that the cladding exerts a stress on the fiber core and/or the scattering region(s) so that the resulting fiber has increased ultimate strength.

The inventive method is applied with particular preference in a multifiber drawing plant. In a multifiber drawing plant, an appropriate number of fibers are drawn from a plurality of preforms at the same time. It is possible to produce fiber bundles efficiently in this way. By way of example, a multifiber drawing plant is described in detail in German patents DE 103 44 205 B4 and DE 103 44 207 B3. In essence, in this case a plurality of preforms are arranged next to one another in a heating unit of a multifiber drawing plant, and a plurality of side-emitting step fibers are simultaneously drawn out in a multifiber drawing plant such that a fiber bundle is obtained that includes side-emitting step index fibers.

The fiber bundle thus obtained can either be further processed, or further processed to form a larger fiber bundle with further fiber bundles with or without side-emitting properties. In order to protect the fiber bundle, a particularly preferred refinement of the inventive method provides that an outer cladding composed of a plastic that is transparent and/or translucent at least in subregions is extruded around the fiber bundle. The plastic used is preferably flameproof.

Alternatively, the fiber bundle can be surrounded by glass fibers that form around the fiber bundle an outer non-combustible cladding that is transparent and/or translucent at least in subregions. This can be performed by wrapping with other glass fibers or by folding over with a cloth of glass fibers.

The inventive side-emitting step index fiber is preferably used together with other optical waveguides and/or other side-emitting step index fibers in a fiber bundle that, as previously described, is surrounded by an outer transparent and/or translucent cladding.

In order to produce rigid fiber bundles, the preforms are not, as in the case of the flexible fiber bundle, drawn out to form fibers with diameters of typically 50 µm to 150 µm, but to form rigid side-emitting step index fibers with a diameter of approximately 0.5 mm to 1 mm. Thereafter, approximately 200 to 10 000 of these rigid individual fibers are tightly packed into a cladding tube whose diameter can be approximately 10 mm to 60 mm, and drawn out to form a rigid fiber bundle having a diameter of approximately 0.5 mm to 20 mm. This fiber bundle has substantially the same side-emitting properties as a flexible fiber bundle. This results, above all, in possibilities of being used up to typically a length of approximately 2 m for exactly straight lighting. Two-dimensional or three-dimensional objects can be produced from the straight fiber rods by thermal forming, for example bending and/or pressing. These can be all lighting solutions named below, or else characters or the like. It is also possible to produce flat fiber rods or generally non-round rigid fiber rods or plates.

Fiber bundles composed both of rigid individual fibers and of flexible fibers are covered by the term fiber bundle for the purpose of the invention.

An inventive fiber bundle can be used for the accentuated lighting of interior spaces and/or facades in architecture. It is preferred in this case to fit the fiber bundles along contours of components of interior spaces, for example passages, support elements, outlines of buildings etc. and to connect them to suitable light sources. Thus, it is possible to adjust the contours of a building or building parts by means of the fiber bundle with side-emitting fibers, and to implement a linear light source.

It is particularly preferred to use the fiber bundle including the inventive side-emitting step index fibers for the purpose of accentuated lighting of interior spaces of vehicles, in particular of automobiles, aircraft, ships and/or trains. In this case, the fiber bundle can be fitted at any desired points, or be laid in contours of these interior spaces. If light is coupled into the fiber bundle, it preferably appears as luminous band or luminous line along these contours. Because the fiber bundle can be configured such that it includes only flameproof materials, it can itself fulfill very strict fire safety regulations. This renders it particularly suitable for use in vehicles of all sorts. A preferred fitting location of an inventive fiber bundle in automobiles can be, for example, a door interior lining in which it is possible in this way to emphasize the contour of the depressions in the door openers, armrest, the transitions in the lining material etc. In the case of aircraft and ships, fitting may be done along the window bands, hand luggage compartments etc.; likewise possible are contour lightings of seats or linings located on the seat, and/or table elements. The inventive fiber bundle can advantageously be used in aircraft and ships to mark escape routes.

It is likewise preferred to use the inventive fiber bundle as part of furniture, in particular of seating furniture, vehicle seats, design interiors and/or kitchens. If the fiber bundle is, for example, incorporated into the seams of seating furniture such as armchairs, sofas, seats etc., the contours of these pieces of furniture can be accentuated as a luminous band when the fiber bundle is lit. By integration in shelves, cupboards, it is possible in this way to fashion entire design interiors with specific light effects.

Particularly in automobile construction, the headlamps are also increasingly being used to produce a repeated recognition value of the manufacturer by means of special lighting devices. Consequently, some automobile headlamps have parking light rings that surround the low beam and when the light is switched on appear as a largely homogeneously luminous ring. Other manufacturers make use, for example, of a strip of LEDs in their headlamps. The inventive fiber bundle is preferably used in headlamps, in particular vehicle headlamps of every type, with particular preference in headlamps of automobiles. The inventive fiber bundle renders it possible to produce any desired preferably homogeneously luminous structures in headlamps. For various reasons, LEDs are also increasingly being applied in automobile headlamps. By contrast with LEDs arranged in strips, this inventive use has the advantage that a few LEDs suffice for producing the lighting. Moreover, by contrast with a strip composed of LEDs no individual points of light are visible, and this can also be preferred for design reasons. Again, one or more LEDs can be coupled into the end face of the inventive fiber bundle. Included in the scope of the inventive use is the function inside headlamps as position light that in turn includes, by way of example, applications as parking light and/or as daytime running light.

A further preferred use of the inventive fiber bundle is the contour lighting of vehicles, in particular of automobiles, aircraft, ships and/or trains. For the appropriate vehicles, this contour lighting can, as the case may be, replace or supplement the prescribed position lights and thus contribute to road safety.

Also preferred is the use of the inventive fiber bundle for the purpose of lighting runways for air-borne vehicles, for example aircraft, helicopters, air ships etc. To date, runways have been lit by a multiplicity of incandescent lamps arranged in a row. These have a limited service life, for which reason there is a constant need in the running of the airport to keep replacing the failed incandescent lamps in such a row. If the inventive fiber bundle is arranged along the runways and/or also in the middle thereof, a linear luminous structure is produced that marks the position of the runway in the dark and/or in poor viewing conditions. The lighting source can couple the light into the fiber bundles at a few central points that need not even be located in the direct vicinity of the runway. The inventive fiber bundle is as far as possible free from maintenance, and so the maintenance of this runway lighting is limited to the few light sources used. By way of example, it is possible in this way to mark the takeoff and landing strips of airports and also to mark those of aircraft carriers, helicopter landing pads and other air-borne vehicles.

A preferred application of the sheet described and covered by the invention is the background lighting of displays. Displays can be indicating devices of any sort, but preferably flat screens, for example computer monitors, flat-screen television sets and displays of mobile telephones and PDAs (Personal Digital Assistants). To date, large format displays that require background lighting have been lit by fluorescent tubes arranged at the edge of the display, or else behind the display surface of the display. The aim is to illuminate the display surface as homogeneously as possible, for which reason there is usually located between fluorescent tubes and display surface a diffuser plate that homogenizes the light emitted by the fluorescent tubes. The light can also be coupled laterally into diffuser plates, for example when the fluorescent tubes are arranged at the edge of the display. However, the diffuser plate then acts as optical waveguide. For relatively small displays, for example, displays of mobile telephones and/or PDAs, light is usually coupled laterally into the diffuser plate from LEDs. Most recently, the LED lighting has been applied more frequently to relatively large displays because it is more cost effective than lighting with fluorescent tubes. The problem in using LEDs is to be able thereby to implement a sufficiently homogeneously lit light surface. The inventive side-emitting fiber bundles can provide a remedy. If they are laid in suitable structures behind the display surface, depending on requirements behind a diffuser plate or else without one, LEDs can couple light into the end faces of the fiber bundles such that the fiber bundle(s) with side-emitting properties ensure(s) the background lighting of the display. If the arrangement of the fiber bundle is matched with the intensity profile of the laterally emitted light, it is also possible thereby to attain cost effectively a large-area homogeneous background lighting for displays.

All above named applications are likewise possible with the aid of such a sheet. In particular, it is also possible for such a sheet to be designed as part of the seating area of seating furniture, but also of clothing and all applications known for textiles.

BRIEF DESCRIPTION OF THE SEVERAL VIEWS OF THE DRAWINGS

The invention is explained further below with the aid of the attached drawings, in which:

FIG. 1a: shows the longitudinal section along the fiber axis of a non-side-emitting step index fiber from the prior art.

FIG. 1b: shows the cross section of a non-side-emitting step index fiber from the prior art.

FIG. 2a: shows the longitudinal section along the fiber axis of an inventive side-emitting step index fiber having a scattering region enclosing the entire periphery of the core.

FIG. 2b: shows the cross section of an inventive side-emitting step index fiber having a scattering region enclosing the entire periphery of the core.

FIG. 3a: shows the longitudinal section along the fiber axis of an inventive side-emitting step index fiber having scattering regions enclosing the entire periphery of the core in subregions along the fiber axis.

FIG. 3b: shows the cross section of an inventive side-emitting step index fiber having scattering regions enclosing the entire periphery of the core in subregions along the fiber axis.

FIG. 4a: shows the longitudinal section along the fiber axis of an inventive side-emitting step index fiber having discrete scattering regions that extend on a subregion of the core periphery along the fiber axis.

FIG. 4b: shows the cross section of an inventive side-emitting step index fiber having discrete scattering regions that extend on a subregion of the core periphery along the fiber axis.

FIG. 5a: shows the longitudinal section along the fiber axis of an inventive side-emitting step index fiber having discrete scattering regions that respectively extend on a subregion of the core periphery on subregions along the fiber axis.

FIG. 5b: shows the cross section of an inventive side-emitting step index fiber having discrete scattering regions that respectively extend on a subregion of the core periphery on subregions along the fiber axis.

DETAILED DESCRIPTION OF THE INVENTION

Figure 6A:
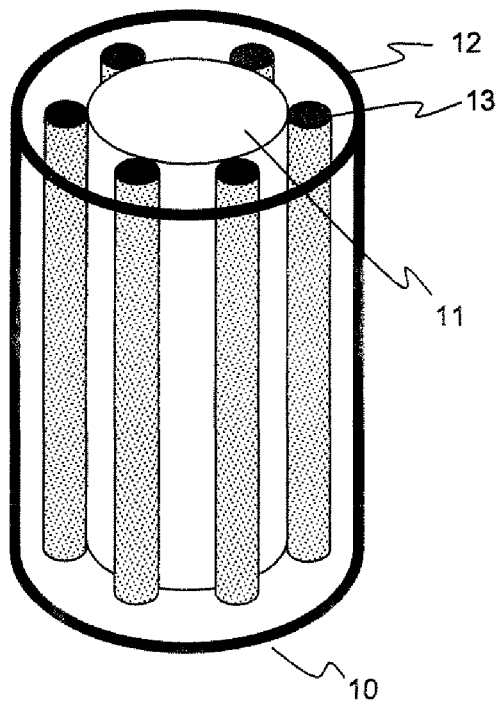
FIG. 6a: shows a preform for producing an inventive side-emitting step index fiber including inlay rods in which scattering centers are embedded.

All the drawings are schematic, the diameters of their elements are not to scale, and also the relative ratios of dimensions of all the elements to one another can deviate from the drawings in the real objects.

FIG. 1a shows the longitudinal section along the fiber axis (A) of a step index fiber from the prior art. This step index fiber consists of a core (1) having the refractive index $n_1$. The entire periphery of said core is surrounded by the cladding (2), which has the refractive index $n_2$. Incident light (4) is guided in the core (1) because total reflection occurs at the cladding (2) by virtue of the smaller refractive index $n_2$. However, the condition of total reflection is possible only up to a limiting angle of the light striking the cladding, which angle depends on the values of the refractive indices of core and cladding. The limiting angle $\beta_{Min}$ can be calculated by $\sin(\beta_{Min}) = n_2/n_1$, $\beta_{Min}$ being measured from a plane perpendicular to the fiber axis.

The refractive indices of the fiber core and of the cladding surrounding it are likewise decisive for the acceptance angle $\alpha_{Max}$ which, measured from the fiber axis (A), describes the maximum angle of the light striking the end face of the fiber that can be coupled into the fiber. The numerical aperture $N_A$ of the fiber can be used as a measure of the ability of the fiber to couple in oblique incident light. It is calculated as $N_A = n \sin(\alpha_{Max}) = (n_1^2 - n_2^2)^{1/2}$, n representing the refractive index of the medium that the light traverses before being coupled into the fiber.

FIG. 1b shows the cross section of the fiber from FIG. 1a, that is to say a section transverse to the fiber axis (A). The fibers illustrated in FIGS. 1a and 1b have no side-emitting properties, since they contain no scattering region.

FIG. 2a shows an inventive side-emitting step index fiber in its longitudinal section along the fiber axis (A). This fiber has a region (3), made from a glass in which scattering particles produced by demixing and/or phase separation are embedded as scattering centers, that is located between core (1) and cladding (2) of the fiber and encloses the entire periphery of the core (1). Light (4) coupled into the fiber is coupled out of the fiber outward, that is to say radially, by the scattering centers in this region (3), even if the angle $\beta_{Min}$ is exceeded. Without the presence of the scattering centers (3), the condition of total reflection would otherwise be fulfilled and the fiber would guide the light substantially in the core (1). It is the scattering of the light (4) on the scattering centers embedded in the region (3) that is responsible for coupling the light (4) out. Because the material of this region (3) in whose matrix the scattering centers are embedded preferably has the same refractive index $n_1$ as the material of the core (1), the light (4) can reach the scattering particles largely without hindrance by the matrix material. Through individual or multiple interaction with the scattering centers, the light can be deflected by the scattering centers from its original incidence angle such that the angle of impingement on the cladding (2) is reduced to the effect that it is smaller than $\beta_{Min}$, and the light can be coupled out of the fiber. If the angle of incidence on the cladding (2) is greater than $\beta_{Min}$, retroreflection takes place into the region (3) depending on impingement and/or interaction with the scattering centers, or into the core (1).

If, on its way through the region (3), the light (4) randomly does not strike any scattering centers, it strikes the cladding (2) and behaves as if there were no region with embedded scattering centers present. This means in this case that if the angle at which the light passes through the region (3), and thus the angle at which it impinges on the cladding (2), is greater than $\beta_{Min}$, it is retroreflected into the region (3) again by the cladding (2). As in the case previously described, for its part the retroreflected light can strike scattering centers again, as a result of which beam paths can be produced that can, in the end, lead to the light beam coupling out of the fiber or being guided in the core (1).

The fact that in this exemplary embodiment the region (3) encloses the entire periphery of the core is well in evidence from FIG. 2b, which shows the cross section of the fiber according to FIG. 2a.

In FIG. 3a, the region (3) having the embedded scattering centers is so configured that it has alternating regions embedded scattering centers that extend along the fiber axis (A) and enclose the entire periphery of the core (1) in accordance with the cross section as in FIG. 3b and alternate with regions along the fiber axis (A) in which no scattering centers are embedded. If the light (4) guided in the core (1) strikes regions having embedded scattering centers (3), the light (4) can be coupled out radially with a specific probability in accordance with the previously described mechanisms. However, if light (5) guided in the core (1) strikes regions without embedded scattering centers, it passes largely unhindered through these regions because, as preferred, they have the same refractive index $n_1$ as the core (1) and can be guided in the fiber by total reflection at the cladding (2). The quantity of light coupled out can be set by the targeted setting of the interval between the scattering regions (3) having embedded scattering centers and the regions without embedded scattering centers. As already described, however, other parameters are also responsible for the efficiency of coupling out.

FIG. 4a shows the longitudinal section of an inventive step index fiber along the fiber axis (A) that has discrete regions (3), made from glass in which scattering centers produced by phase separation and/or demixing are embedded, and which extend along the fiber axis (A) but only on partial regions of the core periphery. This can also be seen, in particular, with the aid of the cross section according to FIG. 4b. In other words, in this case only partial regions of the core peripheral surface are covered by a region (3) in which scattering centers are present. In this case, therefore, there are discrete regions that have the function of coupling out the light. As has already been described, these discrete regions are produced by the fusion of inlay rods with a core rod, the inlay rods consisting of a glass in which the scattering centers are embedded. It is particularly preferred for the scattering centers to be produced by phase separation and/or demixing of the glass itself. However, it is likewise possible to use embedded scattering particles. The shape illustrated in FIG. 4b is to be understood in a purely schematic fashion. The discrete region (3) having the embedded scattering centers can be formed in any way desired. Essentially, the fusing process determines the actual shape of this discrete region (3). As described with the aid of FIG. 2a, the light (4) can be coupled radially out of the fiber through the discrete regions (3) having embedded scattering centers.

In a way similar to the exemplary embodiment in accordance with FIG. 3a, it is also possible in the case of the presence of discrete regions (3) embedded scattering centers in accordance with FIG. 4a for the discrete regions (3) to be provided with scattering centers only on segments of their extent along the fiber axis (A). A longitudinal section along the fiber axis (A) of such a fiber is illustrated in FIG. 5a, a cross section in FIG. 5b.

FIG. 6a shows a preform (10) that is suitable for producing an inventive side-emitting side index fiber having regions enclosing the entire periphery of the core and which have embedded scattering centers, or discrete regions that enclose the core only on subregions of the core periphery, extend along the fiber axis (A) and have embedded scattering centers. It is therefore required as primary product of the inventive side-emitting fiber, and thus also for an inventive fiber bundle. The preform (10) includes a core rod (11) around which the inlay rods (13) are arranged. The core rod (11) and the inlay rods (13) are surrounded by an envelope tube (12). In most cases, core rod (11) and envelope tube (12) are aligned coaxially with one another, that is to say the axis of core rod (11) and envelope tube (12) lie substantially on one another, and at least one inlay rod (13) is located between core rod (11) and envelope tube (12). The axes of the inlay rod (s) (13) are generally aligned parallel to the axis of core rod (11) and envelope tube (12).

The core rod consists of a glass having the refractive index $n_1$, and the envelope tube consists of a glass having the refractive index $n_2$. The inlay rods consist of a glass having the refractive index $n_3$ in which the scattering centers are embedded. It is preferred for the refractive index $n_3$ of the glass of the inlay rods (13) to be greater than the refractive index $n_2$ of the cladding. It is particularly preferred for the refractive index $n_3$ of the glass of the inlay rods (13) to be exactly as large or greater than the refractive index $n_1$ of the core, because in this way the light guided in the core can efficiently pass into the region in which the scattering centers are present, it thereby being possible for the light to be coupled laterally out of the fiber with high efficiency. It is very particularly preferred for the two conditions to be linked together such that it holds in this case that $n_1 \leq n_3 > n_2$, in which case it then holds with particular preference that $n_1 > n_2$.

In order to obtain a fiber under mechanical stress, the glass of the envelope tube (12) is, as described, preferably selected such that its thermal expansion is smaller than that of the glass of the core rod (11).

When the preform (10) is drawn out, the core rod (11) becomes the fiber core (1), and the envelope tube (12) becomes the cladding (2). During fiber drawing, the inlay rods (13) having the embedded scattering centers fuse with the core rod (11) and the envelope tube (12) and become the regions (3) in which the scattering centers are embedded. It is likewise possible for the inlay rods (13) also to fuse with one another in this process. If a correspondingly strong fusing takes place, and/or if an adequate number of inlay rods (13) are obtained in the preform (10), during fiber drawing the inlay rods (13) can form a region (3) having embedded scattering centers and which encloses the entire periphery of the fiber core (1) in accordance with FIGS. 2a to 3b. If the fusing of the inlay rods (13) to one another is incomplete, the discrete region (3) having embedded scattering centers in accordance with FIGS. 4a to 5b result.

Figure 6B:
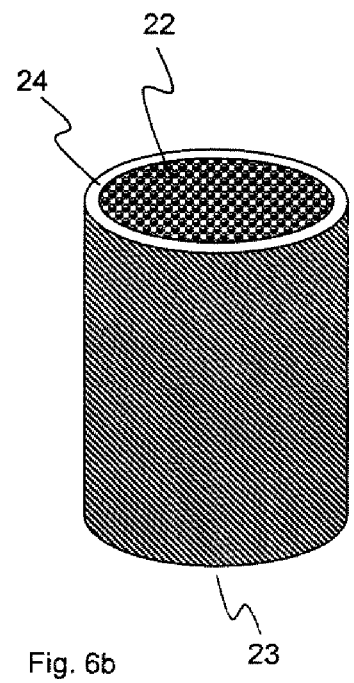
FIG. 6b: shows a fiber bundle including side-emitting step index fibers.

Illustrated in FIG. 6b is a fiber bundle (23) that includes a multiplicity of side-emitting step index fibers (22). In the present form, it is surrounded by an outer cladding (24) that protects the bundle against mechanical loads and, as described, can consist of plastics and/or glass fibers.

Figure 6C:
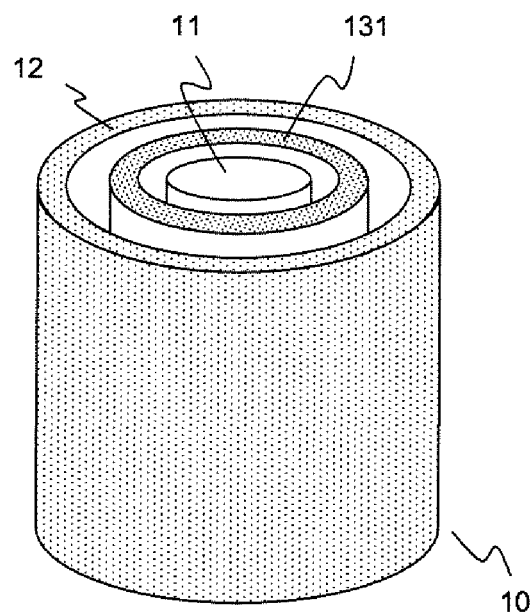
FIG. 6c: shows a preform for producing an inventive side-emitting step index fiber, including an inlay tube in which scattering centers are embedded.

FIG. 6c shows a preform (10), likewise covered by the invention, for producing a side-emitting step index fiber including an inlay tube (131) made from a glass in which there are embedded scattering centers that have preferably been produced by phase separation and/or demixing. It is likewise possible for scattering particles to be embedded as scattering centers. The preform (10) likewise includes a core rod (11) around which the inlay tube (131) is arranged. The core rod (11) and the inlay tube (131) are for their part surrounded by an envelope tube (12). In most cases, core rod (11), inlay tube (131) and envelope tube (12) are aligned coaxially with one another, that is to say that the axis of core rod (11), inlay tube (131) and envelope tube (12) lie substantially on one another, and the inlay tube (131) is located between core rod (11) and envelope tube (12).

The core rod (11) consists of a glass having the refractive index $n_1$, and the envelope tube (12) consists of a glass having the refractive index $n_2$. The inlay tube (131) consists of a glass having the refractive index $n_3$ in which the scattering centers are embedded. It is preferred for the refractive indices $n_1$, $n_2$ and $n_3$ to fulfill the relationships described with the aid of FIG. 6a.

Figure 7:
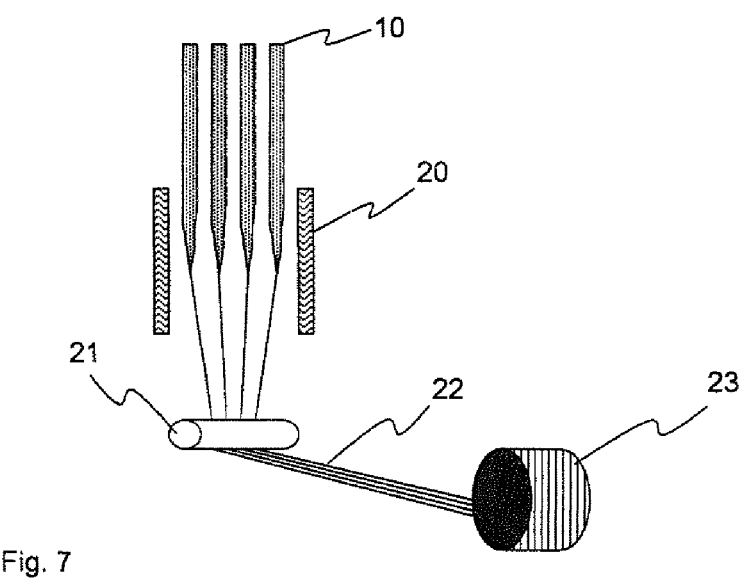
FIG. 7: shows the schematic of a multifiber drawing plant.

FIG. 7 shows the simultaneous fiber drawing of fibers (22) from a plurality of preforms (10) in a multifiber drawing plant. The preforms (10) are introduced into a heating unit (20). At least the lower region of the preforms (10) is brought to drawing temperature. The heating unit (20) usually includes a plurality of heating bushes, each preform (10) being assigned a heating bush. The means for heating of the preform (10) are usually contained in the heating bush. In accordance with the drawing, a plurality of fibers (22) are simultaneously drawn, deflected via a deflection roller (21) and wound up on a take-up spool. Located on the take-up spool is a fiber bundle (23) that in this case is not surrounded by an outer cladding. The number of the fibers in the fiber bundle corresponds to the number of the simultaneously drawn fibers (22).

Figure 8:
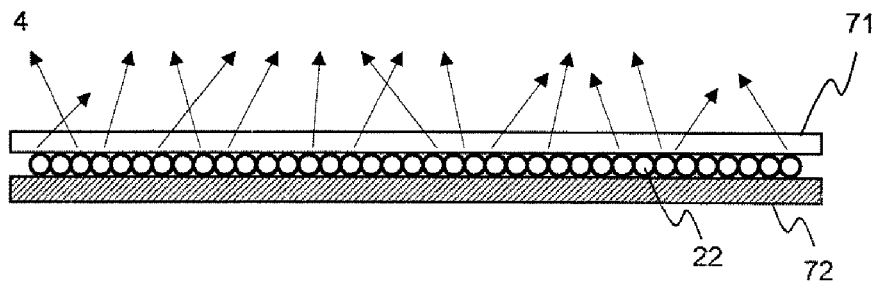
FIG. 8: shows a section transverse to the fiber axis through a sheet in the case of which the inventive side-emitting step index fibers are fixed between a support element and a stabilization element.

FIG. 8 shows the design principle of a sheet in accordance with the invention as a section transverse to the fiber bundle axis (A). The individual side-emitting step index fibers (22) are bonded here as a monolayer on a transparent support element (71) and thus fixed thereby. The light (4) emitted by the side-emitting step index fibers (22) passes through the support element (71) and is preferably emitted from there in all possible spatial directions. The surface of the support element (71) that is averted from the step index fibers therefore acts as a preferably homogeneously luminous emission surface. A stabilization element (72) is connected to the side-emitting step index fibers on the rear side such that these form a sandwich structure together with the support element (71) and the stabilization element (72). By way of example, an aluminum foil that can be fixed in a simple way by bonding can be used as stabilization element (72).

Figure 9:
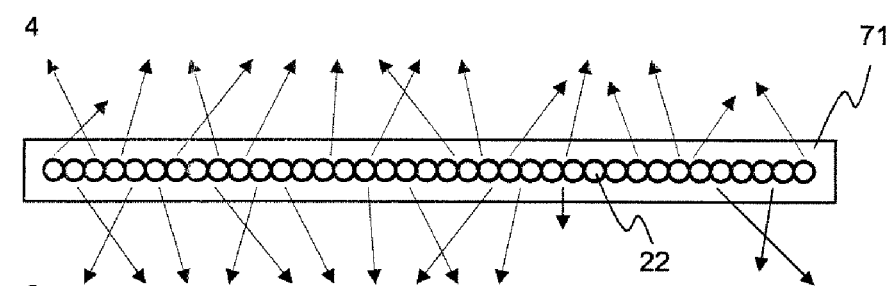
FIG. 9: shows a section transverse to the fiber axis through an alternative sheet in the case of which the inventive side-emitting step index fibers are embedded in a support element.

FIG. 9 illustrates a variant in the case of which a transparent plastic is extruded onto the side-emitting step index fibers (22), which are predominantly aligned in parallel, and in this way forms the support element (71). This can be done in sections as an injection molding process, or as an extrusion process in a quasi endless fashion. The light (4) emitted by the step index fibers can preferably be emitted in this case by both surfaces of the sheet. However, it is likewise possible to provide a surface of the sheet with a reflecting layer such that the light can be emitted only in one direction, although its intensity is increased.

Figure 10:
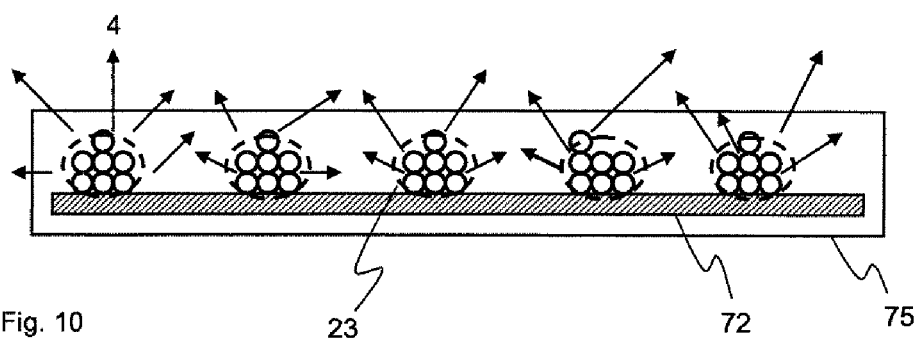
FIG. 10: shows a section transverse to the fiber axis through a sheet in the case of which the inventive side-emitting step index fibers are fixed as fiber bundle on a support element, and the structure is encapsulated in a housing.

In FIG. 10, the side-emitting step index fibers are present at least as a component of fiber bundles (23) spaced apart from one another and in which a multiplicity of side-emitting step index fibers (22) are contained. Here, in this example the fiber bundles (23) are fixed on a support element (71) with a reflective covering layer. The entire arrangement is preferably encapsulated. The light (4) emitted by the fiber bundles (23) passes in this case through the encapsulation (75). The latter can consist of a transparent plastic. Other materials are, however, likewise possible such that a hermetic encapsulation of the sheet is enabled. Of course, it is also possible that, instead of the fiber bundles (23) in the case of this encapsulation solution, side-emitting step index fibers (22) are also fixed on the support element (71).

Figure 11:
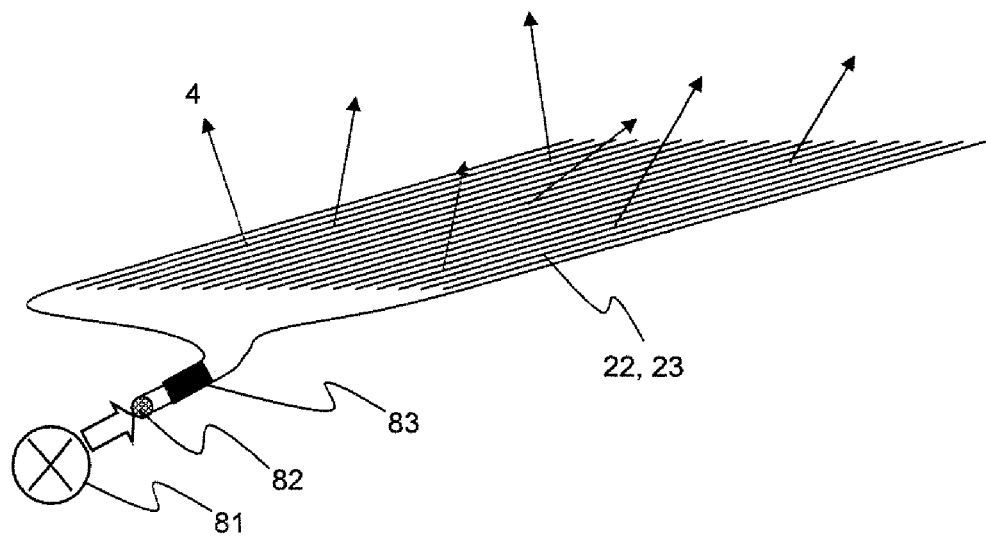
FIG. 11: shows a sheet having measures for connecting light sources.

FIG. 11 shows a sheet in the case of which the side-emitting step index fibers (22) and/or fiber bundles (23) including the side-emitting step index fibers are predominantly arranged in parallel. In this case, the step index fibers (22) and/or the fiber bundles (23) can be fixed to one another and/or be connected to support elements (71) and/or stabilization elements (72) (not illustrated). A light source (81) can be coupled into the end face of the inventive step index fibers (22) and/or the fiber bundles (23). To this end, the step index fibers (22) and/or fiber bundles (23) are combined by means of the optical waveguide bundling (83) such that the flat arrangement is converted into a coupling-in surface (82). The end faces of the step index fibers (22) are preferably combined as tightly as possible in the coupling-in surface (82). If light is coupled via the coupling-in surface (82) from the light source (81) into the step index fibers (22) and/or the fiber bundles (23), and thus into the sheet, can be coupled out laterally through the step index fibers (22) and/or fiber bundles (23) arranged in parallel and emitted by the area.

Figure 13:
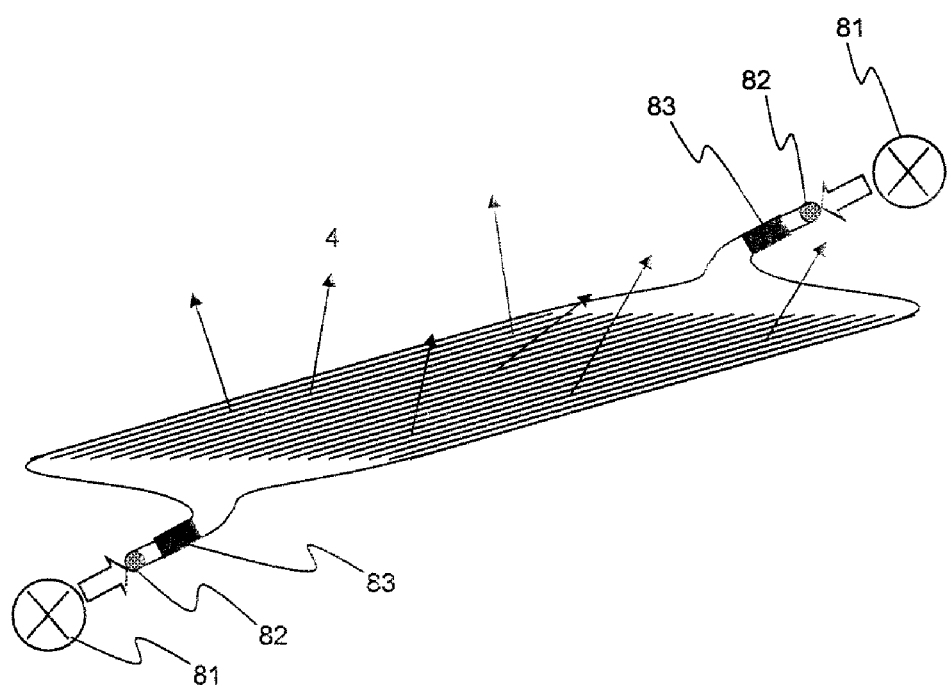
FIG. 13: shows a sheet corresponding to FIG. 11, but having measures for connecting light sources on both end faces of the side-emitting step index fibers.

In accordance with FIG. 13, the sheet can also have two coupling-in surfaces (81, 82) such that light can be coupled into the fiber bundle (23) and/or the side-emitting step index fibers (22) from both end faces. However, a higher number of coupling in surfaces (81, 82) is also possible depending on the type of arrangement of the fiber bundles (23) and/or the side-emitting step index fibers (22).

Figure 12:
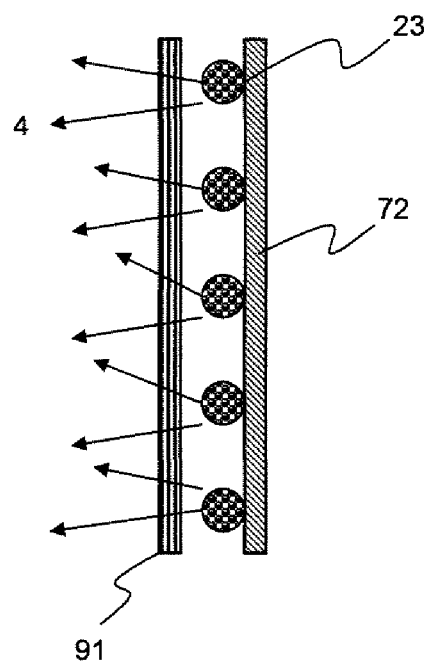
FIG. 12: shows the schematic section through a display including a sheet-like element having inventive side-emitting step index fibers for background lighting of the display.

FIG. 12 illustrates the schematic section through a display including an inventive sheet-like element for background lighting of the display. In this case, a display unit (91) is backlit by means of a plurality of optical waveguide bundles (23) that are arranged parallel to one another and spaced apart from one another and respectively have a multiplicity of side-emitting step index fibers (22). The fiber bundle (23) is fixed on a support element (72) that is preferably silvered on the side facing the fiber bundle (23). The display unit (91) can, for example, be a TFT unit having the two polarization plates and the liquid crystals therebetween. The light (4) emitted by the fiber bundle (23) passes through the TFT unit. It is particularly preferred to use LEDs as light source (81) in this example of application.

Figure 14:
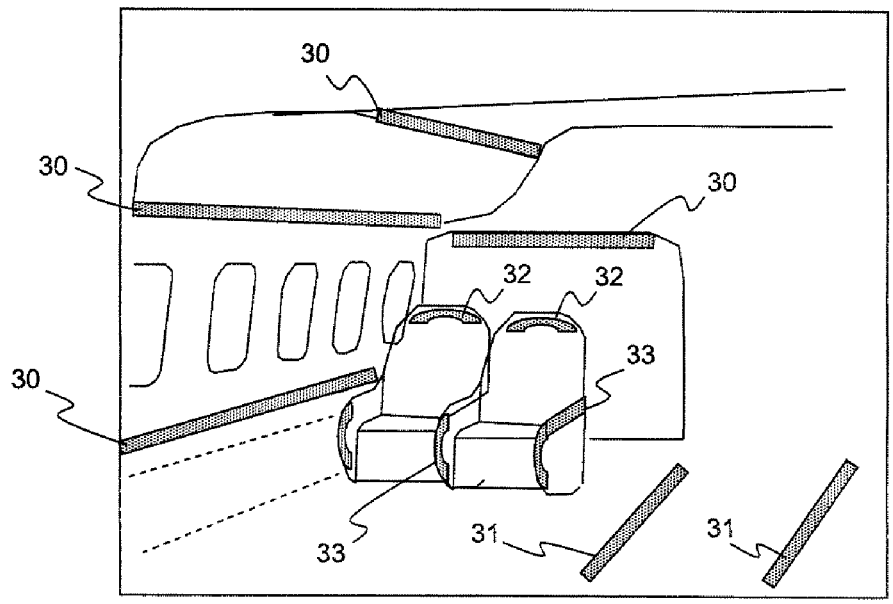
FIG. 14: shows an aircraft interior with applications of fiber bundles having side-emitting properties.

The interior of an aircraft, for example the cabin of a passenger aircraft, is illustrated in FIG. 14. Fiber bundles including the inventive side-emitting fibers can be used in multifarious applications in aircraft cabins. When the outer cladding of the fiber bundles is formed from materials that are flameproof, the fiber bundles, which otherwise contain glass, fulfill the licensing regulations of the authorities responsible for licensing passenger aircraft, and the applicable manufacturer requirements. In FIG. 14, the side-emitting fiber bundles are illustrated occasionally as wide bands. This illustration need not be true to scale. Normally, the fiber bundles are used as a narrow fiber strand that appears as a luminous line.

Such a luminous band can be fitted as contour lighting (30) along the and/or around the window of the aircraft cabin, along the and/or around the compartments of the hand luggage storage, or along and/or around interior partitions. In general, every form of contour lighting is possible inside the aircraft cabin. The side-emitting fiber bundle can be fitted in the floor of the aircraft cabin in order to mark the paths (31) inside the aircraft. This path marking (31) is particularly advantageous for marking the paths to the emergency exits. It is likewise possible to use the side-emitting fiber bundles as contour lighting for seats (33). Color-related moods can be obtained depending on time of day or flight duration by means of coupling in light with the aid of colored and/or tunable RGB light sources. Aside from the decorative effect, these applications have the advantage that the ambient light can be reduced in order to set nighttime conditions in the cabin that are set for the passengers in order to support sleep phases, but still allow the passengers to find their seating places. It has been recognized that journeys are rendered more free form stress for passengers on long-haul flights, in particular, by inclusion of sleep phases. The same holds true for differently colored light-related moods in different flight phases in which light-related moods are set, for example, as a function of the biorythm of the passengers. Consequently, ever higher value is being placed on suitable nighttime equipment and light-related moods that can be set by color in the interior of aircraft cabins.

If the side-emitting light-guiding fibers are used in the form of a sheet, for example by weaving them with textile fibers, they can be integrated in the woven fabric of the seat covers. It is then possible to use the fibers not only to implement contour lighting, but also to fashion areas such as parts of the surface of the seats (32) in a luminous fashion.

Figure 15A:
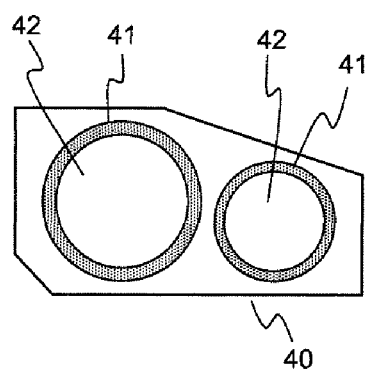
FIG. 15a: shows an automobile headlamp with fiber bundles having side-emitting properties.

FIG. 15a shows an automobile headlamp (40) in which side-emitting fiber bundles take on lighting tasks. In this example, they enclose as a ring (41) the low beam (42) and/or high beam (42). The side-emitting fiber bundles can thus be used inside the headlamp (40) as parking light and/or daytime running light.

Figure 15B:
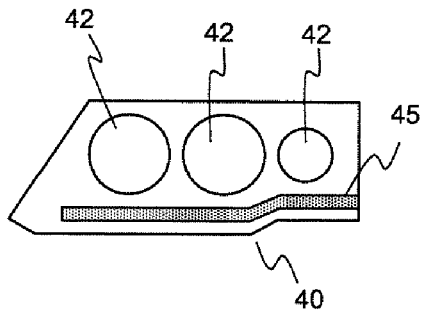
FIG. 15b: shows a further automobile headlamp with fiber bundles having side-emitting properties.

FIG. 15b likewise illustrates an automobile headlamp (40) in which the side-emitting fiber bundle (45) is arranged as a strand below the main headlamps (42). In this example, as well, it is possible to implement the tasks as parking and/or daytime running light aside from decorative functions.

The application of the inventive fiber bundle (41, 45) in automobile headlamps (40) is advantageous because the fiber bundle (41, 45) consists at least predominantly of glass, and is thus resistant to heat and weathering that can be amplified by the action of aggressive substances. The inventive fiber bundle made from glass is less sensitive to weathering and thermal loading than side-emitting fiber bundles made from plastics. Moreover, very much higher powers can be coupled into fiber bundles made from glass than it is possible to couple into fiber bundles made from plastic.

Likewise, LEDs, in particular, are especially well suited for coupling into side-emitting fiber bundles, since their emitting surface, which is small by comparison with incandescent lamps or gas discharge lamps, enables an efficient coupling in without an optical system of large volume. It is thereby possible to economize on costs, weight and space in an automobile headlamp. By contrast with the fitting of LEDs arranged in the form of a band, the use of a side-emitting fiber bundle (41, 45) in automobile headlamps (40) has the advantage that the light is emitted homogeneously so that an aesthetically unappealing impression of individual luminous points does not arise, other traffic users are not irritated by a multiplicity of luminous points, the luminous effect is largely independent of angle and the number of LEDs is reduced and thereby enabling energy to be saved when using the headlamp—and this, in turn, can lower the fuel consumption of the vehicle and thus its $CO_2$ emissions.

Figure 16:
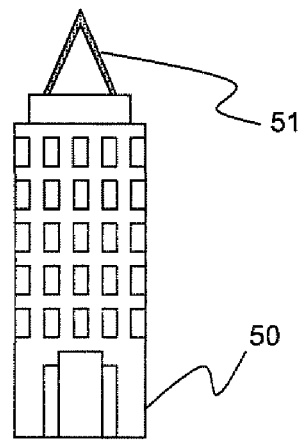
FIG. 16: shows a building having a tip accentuated by lighting.

FIG. 16 shows the contour lighting (51) of parts of a building (50). In the present example, the building is a high rise building, the outlines of the cupola roof appearing luminous to the viewer owing to the side-emitting fiber bundles fitted there.

Figure 17:
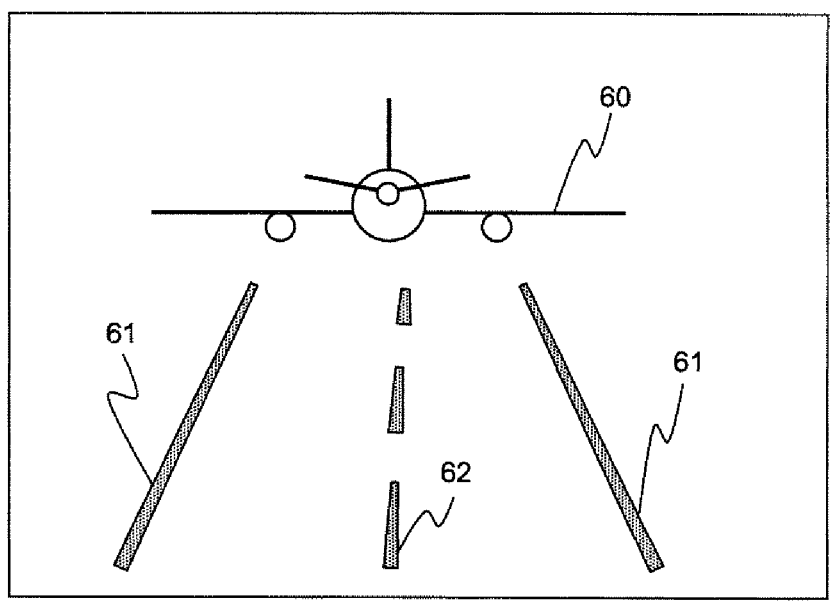
FIG. 17: shows the runway of an airport having luminous runway marking.

FIG. 17 illustrates the application of the inventive fiber bundles with side-emitting properties as runway marking for aircraft (60). Both the lateral markings (61) and a center strip (62) can, as previously described, advantageously be implemented by means of the inventive side-emitting step index fibers.

Figure 18:
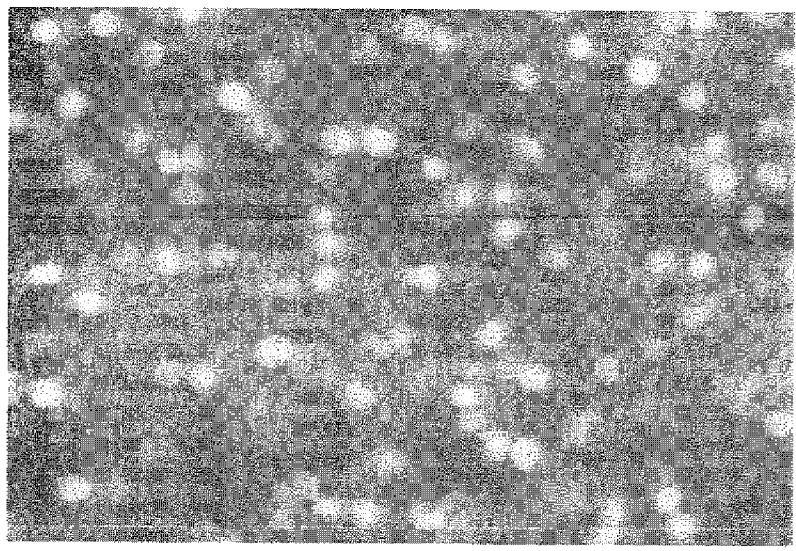
FIG. 18: shows SEM/EDX photographs of spherical scattering particles in a Pb-containing glass.

FIG. 18 shows a SEM/EDX photograph of a glass that can preferably be used for inlay rods (13) and/or inlay tubes (131). As is generally known to the person skilled in the art, SEM stands as an abbreviation for Scanning Electron Microscope. Its functional principle is based, then, on using a thin electron beam to scan the object. In this process, the electrons emerging from the object or backscattered, or else other signals, are detected synchronously. The recorded current determines the intensity value of the assigned pixel. EDX stands for energy dispersive x-ray analysis method, which is likewise well known to the person skilled in the art. This method is particularly suitable for chemical analyses on surfaces in the μm range.

The entire image shown in FIG. 18 shows an approximately 7 μm wide region of the glass sample. In the present case, an Na—Al—K—As—Pb silicate glass, and thus a Pb-containing glass, was examined with this method. The circular light spots show the scattering centers that are embedded in the glass and here have an approximately identical size distribution and are spherical in reality. Their diameter is approximately 100 nm to 600 nm. The result of the evaluation of the EDX spectra was that in terms of quality the spherical scattering centers have the same composition as the Na—Al—K—As—Pb silicate glass surrounding them, but exhibit considerably higher contents of As and Pb. It is therefore assumed that the scattering centers are demixing products. These are already present in the glass before the fiber drawing, which is why this glass appears opaque white.

Figure 19:
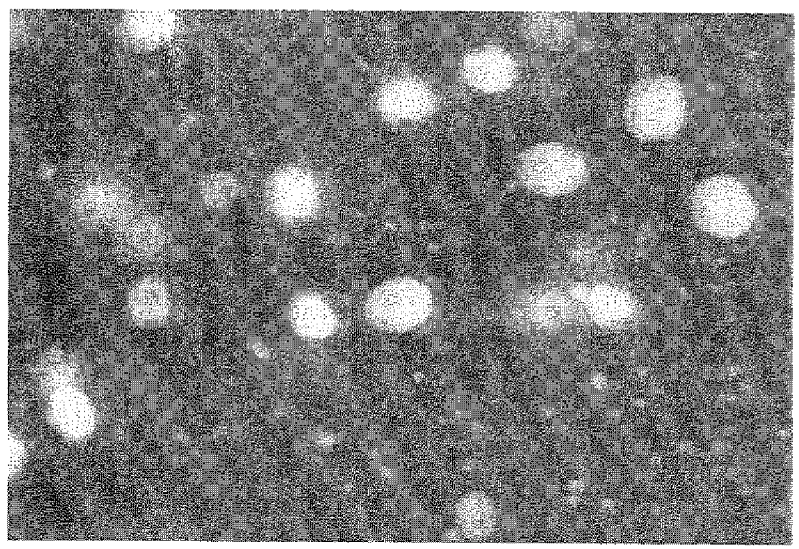
FIG. 19: shows SEM/EDX photographs of spherical scattering particles having an inhomogeneous size distribution in a Pb-containing glass.

FIG. 19 likewise illustrates a SEM/EDX photograph of another Na—Al—K—As—Pb silicate glass with the same scale as in FIG. 18. A striking feature here is the presence of scattering centers of two different size classes that are intermixed. Here, as well, it is assumed on the basis of the EDX spectra that these scattering particles have an increased content of As and Pb and are formed as a demixing product of the glass matrix surrounding them.

Figure 20:
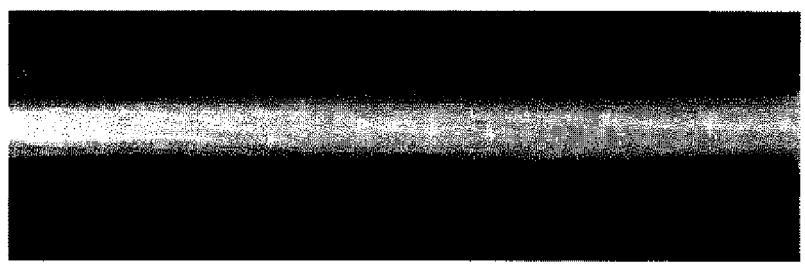
FIG. 20: shows a photograph of a fiber bundle including side-emitting step index fibers whose scattering centers are produced by embedded Pt particles.

FIG. 20 shows a photograph of a fiber bundle including side-emitting step index fibers whose scattering centers are produced by embedded Pt particles as scattering centers. As is to be seen in FIG. 20, such a fiber exhibits an efficient lateral coupling out with a very uniform brightness profile over the fiber bundle length illustrated, but also individually strongly luminous points of light. These strongly luminous points of light can be desired or undesired depending on application.

Figure 21:
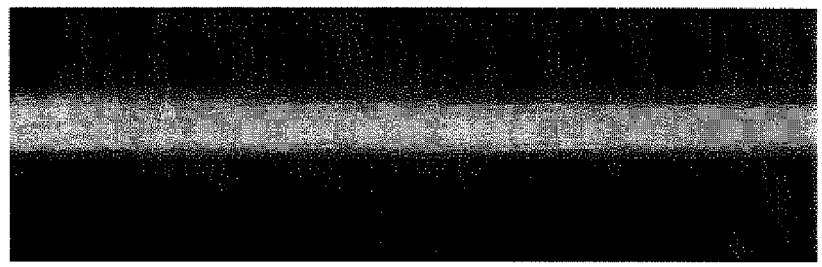
FIG. 21: shows a photograph of a fiber bundle including side-emitting step index fibers whose scattering centers are produced by phase separation and/or demixing.

FIG. 21 illustrates the photograph of an inventive fiber bundle (23) including inventive side-emitting step index fibers (22) whose scattering centers were produced, as described, by phase separation and/or demixing. A striking feature by comparison with FIG. 20 is that the inventive fiber bundle shown has a very uniform brightness profile over the fiber bundle length, and is, moreover, very homogeneously luminous, that is to say no individually brightly luminous points of light are to seen, and so the fiber bundle (23) appears as a homogeneously luminous strip.

Figure 22:
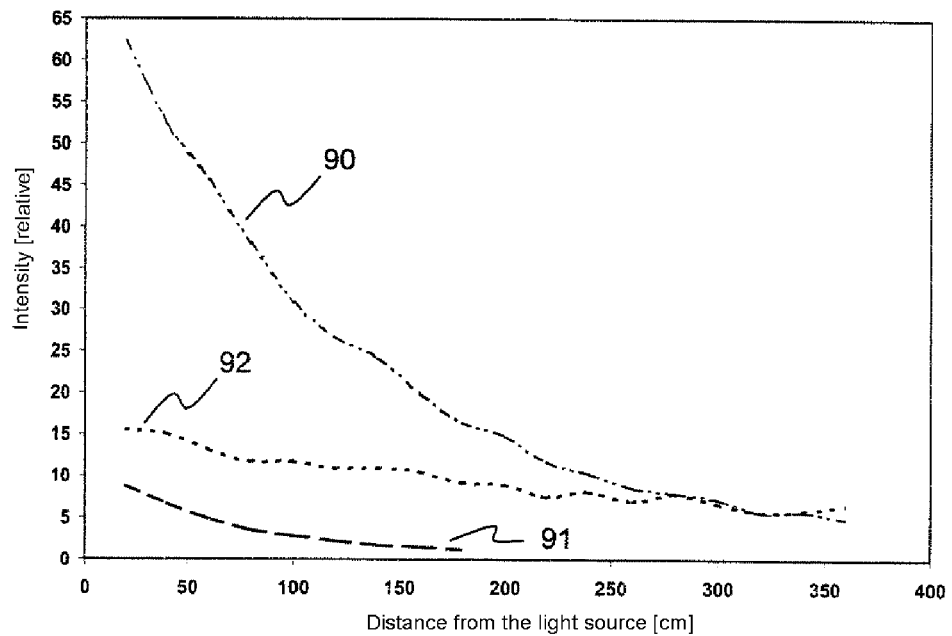
FIG. 22: shows measuring curves of the brightness distribution of inventive side-emitting step index fibers as a function of fiber length.

FIG. 22 shows the measured brightnesses of the lateral emission of inventive side-emitting step index fibers (90, 91, 92) plotted against the distance from the end face of the fiber. The curve (92) represents an inventive side-emitting step index fiber in the case of which the scattering centers are produced by adding Pt particles, but not by demixing and/or phase separation. The measurement of the brightness as a function of the distance gives the brightness distribution profile of the side-emitting fiber. It is desirable for most applications to have brightnesses as intense as possible over as large as possible a distance. The brightness values in FIG. 22 are specified in arbitrary units. Curve (90) shows the brightness distribution profile of an inventive side-emitting step index fiber that were drawn out from a preform with 3 inlay rods having a diameter of 300 µm, the inlay rods consisting of a glass in which inhomogeneous regions resulting from phase separation and/or demixing are embedded as scattering centers. In contradistinction, curve (91) shows an inventive side-emitting step index fiber in the case of which the preform consists of the same inlay rods as for curve (90), but only 2 inlay rods were used. As can be recognized, the brightnesses and thus the coupling-out efficiency of the side-emitting step index fibers (90, 91) differ significantly. A relatively large number of inlay rods leads to a more intense coupling out, the brightness profile decreasing more quickly at a distance from the light source, but also, in relation to the input intensity. The efficiency of the coupling out can therefore be scaled in a simple way by the number of the inlay rods.

The side-emitting step index fiber that was measured for the curve (92) was produced from a preform having 30 inlay rods, the scattering centers in the inlay rods being represented by Pt particles having a diameter size distribution of 150 nm to 450 nm. Comparison of curves (90) and (91) having scattering centers that were produced by phase separation and/or demixing with curve (92) having scattering centers that are presented by Pt particles shows that with the aid of inlay rods based on curves (90) and (91), a in the case of curve (90) it is possible to attain with less material and substantially lower costs a higher coupling-out efficiency than through the use of the inlay rods that are based on curve (92). However, the relative decrease in the intensity for curve (92) is substantially less than for curves (90) and (91).

It is therefore to be seen that the efficiency of the coupling out can be set in accordance with the respective requirement both by the selection of the number of the inlay rods, and thus via the quantity of scattering centers in the fiber, and via the selection of the scattering centers themselves. In particular, it is also possible to mix different inlay rods having different scattering centers in one preform and to make use of inlay rods that, for example, contain scattering centers made from Pt particles and scattering centers that are formed by phase separation and/or demixing.

Figure 23:
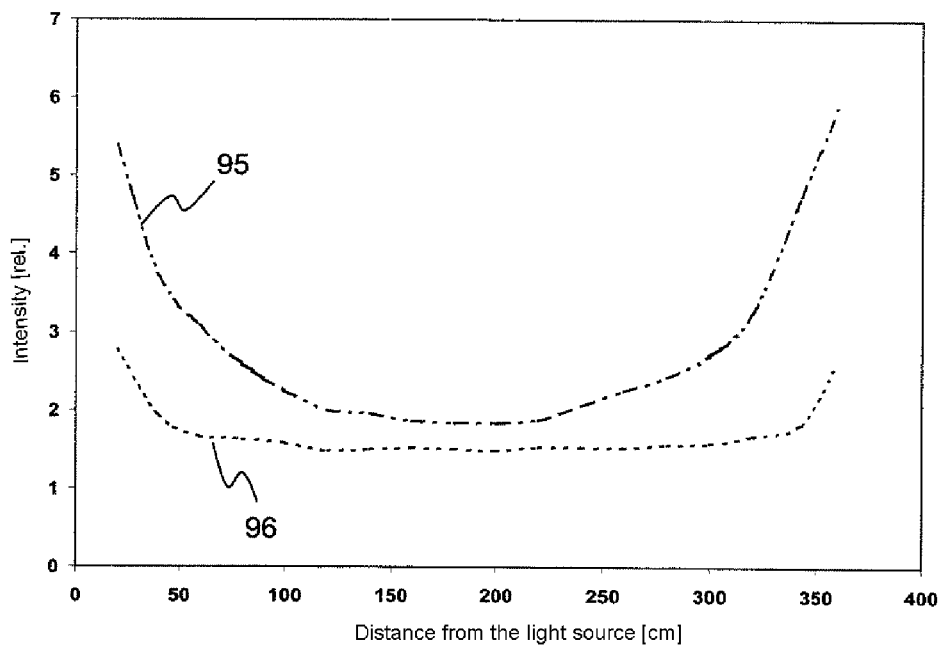
FIG. 23: shows measuring curves of the brightness distribution of inventive side-emitting step index fibers as a function of fiber length.

As in the case of FIG. 22, FIG. 23 in turn plots the measured brightnesses of the side emission of an inventive side-emitting step index fiber (95) against the distance from the end face of the fiber, but otherwise than in FIG. 22, does so with coupling in at both ends. The brightness values in FIG. 23 are likewise specified in arbitrary units. Curve (95) represents the same side-emitting step index fibers as described with reference to curve (90), and curve (96) represents a side-emitting step index fiber as described with reference to curve (92). As is easily to be recognized in the comparison of FIGS. 22 and 23, coupling in from both ends increases the intensity precisely in the middle part of the fiber, for which reason coupling in from both ends is preferred for many applications.

Curve (95) shows consistently higher intensities than curve (96), but the brightness drop in curve (96) is more strongly expressed. Of course, the previously described possibilities for scaling the side-emission effect are also possible in the case of coupling in at both ends.

Figure 24:
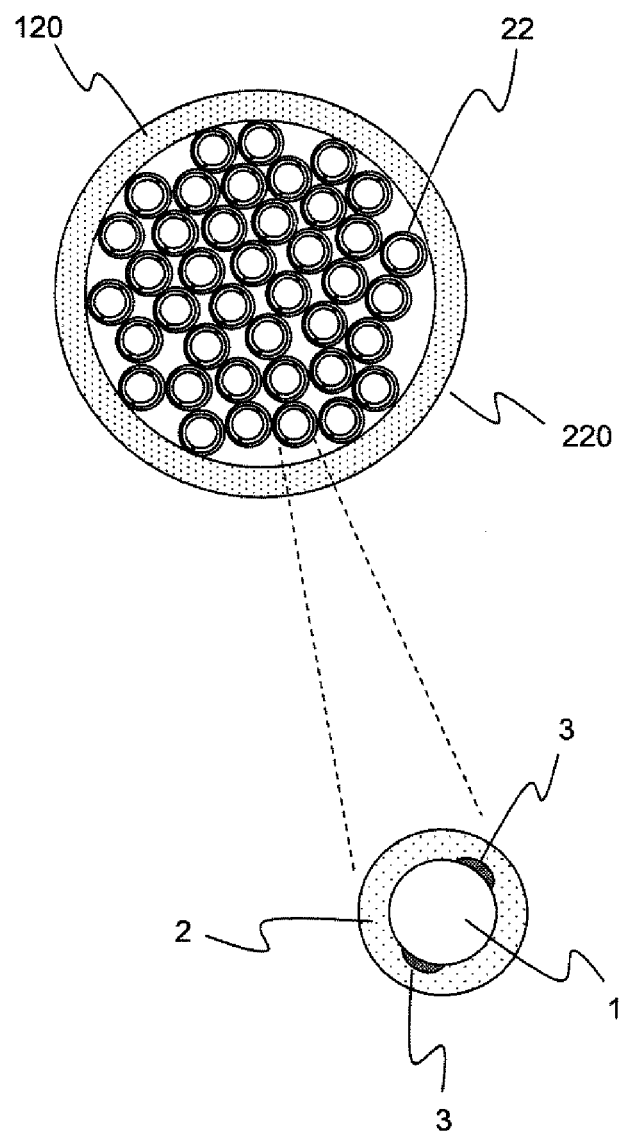
FIG. 24: shows the cross section through a rigid fiber rod including the inventive side-emitting step index fibers in rigid form.

FIG. 24 shows the cross section through a rigid fiber rod (220) including a plurality of inventive side-emitting step index fibers (22) in rigid form, and an enlargement of the schematic cross section through an inventive rigid side-emitting step index fiber. The fiber rod (220) is surrounded by a cladding (120) made of glass, in the interior of which there are located the side-emitting step index fibers (22). The cladding (120) can alternatively also be fabricated from plastics. As already described, it is preferably transparent and/or translucent at least in subregions such that light can be coupled out of the fiber rod (220) in these regions, and can be perceived by an observer. The individual side-emitting step index fibers (22) can be fused with one another at their contact surfaces. The same holds for the contact surfaces of the individual side-emitting step index fibers (22) having the cladding (120). The cladding (120) chiefly serves the purpose of holding the side-emitting step index fibers (22) together and/or of protecting against external influences. In particular, the cladding (120) can prevent particles or other substances from being able to penetrate into the interspaces between the individual side-emitting step index fibers (22). Moreover, thanks to the cladding (120), the fiber rod (220) has a substantially smooth surface, and this is advantageous for some requirements.

Illustrated in an enlarged fashion in FIG. 24 is, furthermore, the schematic cross section through an individual side-emitting step index fiber (22). This corresponds substantially to the cross section illustrated in FIG. 4b. The side-emitting step index fiber (22) consists of the core (1), which is surrounded by the cladding (2). Located between the two in the drawing are two scattering regions (3). These are illustrated in punctiform fashion in the drawing, but are intended to symbolize that they have been produced by means of two inlay rods (13) that are fused with the core (1). It is likewise possible for the scattering regions (3) also to be fused with one another such that they enclose the core (1) along the core peripheral surface.

In order to produce a preferred embodiment of the inventive side-emitting step index fiber, a core rod (11) with a fire-polished surface was drawn out together with inlay rods (13) and an envelope tube to form a fiber in accordance with the described method. The core rod had a diameter of 30 mm. The envelope tube (12) had an outside diameter of 35 mm and an inside diameter of 33.5 mm. The core rod (11) was plugged into the envelope tube (12) fused onto one end, and 1 to 100 inlay rods (13) made from a glass having the same composition as the core rod (11) were arranged in the gap therebetween, there having been added thereto in the melt, however, nanofine zirconium particles or nanofine noble metal particles in the range of concentration from 1 ppm to 100 ppm. The diameter of the inlay rods was between 0.1 mm and 2 mm. The closed end of the preform (10) thus produced was moved into the heating unit (20) of a known drawing plant with the application of low pressure at the open end of the preform between core rod (11) and envelope tube (12), and heated up to the drawing temperature. The drawing temperature was typically between 800° C. and 1100° C. After softening of the end of the preform (10), the latter was drawn downward from the heating unit (20) and thereby tapered to form a fiber. This process softened the inlay rods (13) so greatly that they were deformed and finally formed a scattering region (3) between core (1) and cladding (2) of the fiber (22). Feeding the preform (10) in the heating unit (20) enabled a continuous fiber drawing process resulting in a side-emitting step index fiber having a diameter of 5 μm to 300 μm and a length of several kilometers.

In order to produce another preferred embodiment of the inventive side-emitting step index fiber, a core rod (11) having a fire-polished surface was drawn out to form a fiber together with inlay rods (13) and an envelope tube in accordance with the described method. The core rod had a diameter of 30 mm. The envelope tube (12) had an outside diameter of 35 mm and an inside diameter of 33.5 mm. The core rod (11) was plugged into the envelope tube (12) fused at one end, and 1 to 30 inlay rods (13) made from an As—Pb-containing silicate glass were arranged in the gap lying therebetween, there being embedded in said glass scattering centers that contained an increased content of Pb and were produced by phase separation and/or demixing. Such a glass can be obtained commercially from various manufacturers as colored glass. The available glass rod having a diameter of a few millimeters was drawn out for production to a typical thickness of between approximately 100 μm and 1 mm, as previously described.

A preform (10) with 1 to 20 inlay rods (13) made from a colored glass and having a diameter of 0.1 mm to 0.5 mm is drawn out to a thickness of from 1 mm to 20 mm, and preferably from 3 mm to 10 mm, in order to produce a previously described light-guiding rod that essentially consists of a rigid side-emitting step index fiber surrounded by an envelope glass. The scattering centers embedded in the colored glass are produced by inhomogeneities of the colored glass and are contained in the colored glass from the beginning. The side-emitting step index fiber obtained in this way is rigid because of this diameter.

In the case of the light-guiding rod described, the inlay rods (13) can be arranged in a fashion distributed around, or be arranged in a fashion concentrated on one side, it thereby being possible to arrange the effect of the lateral light emission in terms of its emission characteristic.

The scattering centers embedded in the colored glass are produced by inhomogeneities of the colored glass and are contained in the colored glass from the beginning. The side-emitting step index fiber obtained in this way is rigid because of this diameter.

A preform consisting of typically 500 to 2000, preferably of from 800 to 1200 individual rigid side-emitting step index fibers (22) having a diameter of from 0.5 mm to 1 mm and an envelope tube up to a thickness of 1 mm to 20 mm, and preferably from 3 mm to 10 mm, was drawn out in order to produce a described rigid fiber rod (220) containing a plurality of rigid side-emitting step index fibers (22). The individual rigid side-emitting step index fibers (22) were, as previously described, produced by being drawn out from preforms (10) comprising core rods (11), inlay rods (13) and envelope tube (12). Thus, the production of a rigid fiber rod (220) is, at it were, a redrawing process of previously produced side-emitting step index fibers (22).

In further process steps, both the light-guiding rod described and the fiber rod (220) described can be bent and/or pressed in two dimensions and also in three dimensions by means of hot forming processes in order, for example, to change the cross sectional geometry thereof and/or adapt the shape thereof to the requirements.

Glasses having the compositions given below can advantageously be used as materials for the core rod (11) and thus for the core (1).

Core glass variant 1 with refractive index $n_1$ from 1.65 to 1.75, containing (in mol %, based on oxide)

| | | | |
|---|---|---|---|
| $SiO_2$ | 25 to 45 | $Ta_2O_5$ | 0.1 to 6 |
| $B_2O_3$ | 13 to 25 | $ZrO_2$ | 0.1 to 8 |
| CaO | 0 to 16 | ZnO | 0.1 to 8 |
| SrO | 0 to 8 | CaO + SrO + BaO + ZnO | >33 |
| BaO | 17 to 35 | $Al_2O_3$ | 0 to 5 |
| $La_2O_3$ | 2 to 12 | | |

Core glass variant 2 having refractive index $n_1$ from 1.65 to 1.75, containing (in mol % based on oxide)
$SiO_2$ 54.5 to 65
ZnO 18.5 to 30
Sum of the alkali metal oxides 8 to 20
$La_2O_3$ 0 to 3
$ZrO_2$ 2 to 5
$HfO_2$ 0.02 to 5
$ZrO_2+HfO_2$ 2.02 to 5
BaO 0.4 to 6
SrO 0 to 6
MgO 0 to 2
CaO 0 to 2
Sum of the alkaline-earth metal oxides 0.4 to 6
$Li_2O$ 0.5 to 3, but not more than 25 mol % of the sum of the alkali metal oxides
$SiO+ZrO_2+HfO_2>58.5$
Ratio ZnO:sum of the alkaline-earth metal oxides >3.5:1

Core glass variant 3 having refractive index $n_1$ from 1.58 to 1.65, containing (in mol % based on oxide)

| | | | |
|---|---|---|---|
| $SiO_2$ | 50 to 60 | $Nb_2O_5$ | 0 to 4 |
| $B_2O_3$ | 0 to 15 | $La_2O_3 + Y_2O_3 + Nb_2O_5$ | 0 to 4 |
| BaO | 10 to 35 | $Na_2O$ | 4.5 to 10 |
| SrO | 0 to 18 | $K_2O$ | 0.1 to 1 |
| Sr + Ba | 10 to 35 | $Rb_2O$ | 0 to 1.5 |
| ZnO | 0 to 15 | $Cs_2O$ | 0 to 1.5 |
| Sr + Ba + Zn | 10 to 40 | $Rb_2O + Cs_2O$ | 0 to 1.5 |
| $B_2O_3$ + ZnO | 5 to 35 | Sum of the alkaline-earth metal oxides | 4.8-11 |
| $Al_2O_3$ | 0.1 to 1.9 | MgO | 0 to 6 |
| $ZrO_2$ | 0 to 4 | CaO | 0 to <5 |
| $La_2O_3$ | 0 to 4 | | |
| $Y_2O_3$ | 0 to 4 | | |

Core glass variant 4 having refractive index, containing (in wt. %, based on oxide)
$SiO_2$ 42 to 53
ZnO 30 to 38
$Na_2O<14$
$K_2O<12$
$Na_2O+K_2O\geq2$
BaO<0.9

Core glass variant 5 having refractive index, containing (in wt. %, based on oxide)
$SiO_2$ 30 to 45
$B_2O_3<12$
ZnO<10
BaO 25 to 40
$Na_2O<10$ K$_2$O<2
Al$_2$O$_3$<1
La$_2$O$_3$<10
Cladding glass variant 1 (in wt. %, based on oxide), containing

| SiO$_2$ | 70 to 78 | MgO | 0 to 1 |
|---|---|---|---|
| Al$_2$O$_3$ | 0 to 10 | CaO | 0 to 2 |
| B$_2$O$_3$ | 5 to 14 | SrO | 0 to 1 |
| Na$_2$O | 0 to 10 | BaO | 0 to 1 |
| K$_2$O | 0 to 10 | F | 0 to 1 | and substantially no Li$_2$O.
Cladding glass variant 2 (in wt. %, based on oxide), containing

| SiO$_2$ | 63 to 75 | MgO | 0 to 5 |
|---|---|---|---|
| Al$_2$O$_3$ | 1 to 7 | CaO | 1 to 9 |
| B$_2$O$_3$ | 0 to 3 | BaO | 0 to 5 |
| Na$_2$O | 8 to 20 | F | 0 to 1 |
| K$_2$O | 0 to 6 | | | and substantially no Li$_2$O.
Cladding glass variant 3 (in wt. %, based on oxide), containing
SiO$_2$ 75 to 85
Al$_2$O$_3$ 1 to 5
B$_2$O$_3$ 10 to 14
Na$_2$O 2 to 8
K$_2$O 0 to 1
and substantially no Li$_2$O and MgO.
Cladding glass variant 4 (in wt. %, based on oxide), containing
SiO$_2$ 62 to 70
B$_2$O$_3$>15
Li$_2$O>0.1
Na$_2$O 0 to 10
K$_2$O 0 to 10
MgO 0 to 5
CaO 0 to 5
SrO 0 to 5
BaO 0 to 5
ZnO 0 to 5
F 0 to 1
Cladding glass variant 5 (in wt. %, based on oxide), containing
SiO$_2$ 60 to 72
B$_2$O$_3$<20
Al$_2$O$_3$<10
Na$_2$O<18
K$_2$O<15
Li$_2$O<5
F≤1
Cladding glass variant 6 (in wt. %, based on oxide), containing
SiO$_2$ 72-78
B$_2$O$_3$ 5 to 15
Al$_2$O$_3$ 5 to 10
Na$_2$O<10
K$_2$O<10
Li$_2$O<5
F≤1
Cladding glass variant 7 (in wt. %, based on oxide), containing
SiO$_2$ 70-80
B$_2$O$_3$<5
Al$_2$O$_3$<10
La$_2$O$_3$<2
Na$_2$O<10
K$_2$O<10
ZrO$_2$<2

As described, within the meaning of the invention all glasses used for the core glasses can also be used for the glass of the inlay rods (13), and therefore serve as matrix glass for the production of the scattering region (3) by virtue of the fact that scattering particles are embedded in the glass, particularly when scattering particles are used as scattering centers.

The glass fibers obtained in this way have an outstanding ultimate strength. Loop tests carried out deliver the following values in the loop test for side-emitting step fibers that were drawn from the abovenamed glasses at a drawing temperature of 1040° C.:

| | $N_I$ = 15 FF = 150-450 | $N_I$ = 15 FF = 500-1200 | $N_I$ = 30 FF = 150-450 | $N_I$ = 30 FF = 500-1200 |
|---|---|---|---|---|
| $d_{Min}$ [mm] | 1 | 1 | 1 | 1 |
| $d_{Max}$ [mm] | 4 | 3 | 2 | 4 |
| $d_{Strength}$ [mm] | 1.84 | 1.36 | 1.88 | 1.64 |

The scattering particles consisted in this case chiefly of Pt. $N_I$ denotes the number of the inlay rods used in the preform, where FF denotes the form factor, which is synonymous with the diameter of the scattering particles. FF=150-450 consequently symbolizes the presence of scattering particles in a grain size distribution having the diameters of 150 nm to 450 nm. FF=500-1200 consequently scattering particles in a grain size distribution having diameters of 500 nm to 1200 nm. 25 loop tests were carried out respectively for each combination of $N_I$ and FF. $d_{Min}$ specifies the smallest diameter in mm of the loop at which the fiber breaks, $d_{Max}$ is the largest diameter in mm of the loop at which fiber breakage was to be observed. $d_{Strength}$ is the arithmetic mean of the individual results of the respective 25 loop tests, in mm.

It may be seen from the table that the increase in the diameters of the scattering particles owing to the decrease in $d_{Strength}$ seems to lead to a slight improvement in the ultimate strength. An increase in the number of the inlay rods seems, however, to reduce the ultimate strength slightly. Comparison with a glass fiber without the inventive scattering regions, which has a value of $d_{Strength}$=1.25 mm substantiates, however, that the inventive side-emitting step index fibers still ensure a very good ultimate strength. Side-emitting step index fibers having non-round core diameters, such as are known from the prior art, break significantly earlier in the loop tests.

By comparison with the side-emitting step index fibers known from the prior art, the inventive side-emitting step index fibers have the advantage, moreover, that they couple out light to the side more efficiently, that the effect of the side emission can be scaled very well by using the inlay rods (13) for the relevant applications, and that the inventive side-emitting step index fibers are fire resistant because of the material of which they consist. Consequently, they can be used in areas with more stringent fire protection regulations. These are fields of application that are closed, in particular, to fibers made from plastics. Fiber bundles including the inventive side-emitting step index fibers can be produced economically by machine with the aid of the inventive method.

The invention claimed is:

1. A side-emitting step index fiber comprising a light-guiding core made from glass with a first refractive index, and a transparent and/or translucent cladding that is made from glass with a second refractive index and encloses the core along a fiber axis, wherein located between core and cladding is at least one scattering region that is formed from a glass that has a third refractive index and in which there are embedded scattering centers, wherein the third refractive index differs substantially from the second refractive index, wherein the third refractive index is at least equal to or greater than the first refractive index.

2. The side-emitting step index fiber as claimed in claim 1, wherein the at least one scattering region encloses an entire periphery of the core along the fiber axis.

3. The side-emitting step index fiber as claimed in claim 1, wherein the at least one scattering region extends on a subregion of a periphery of the core along the fiber axis.

4. The side-emitting step index fiber as claimed in claim 1, wherein the at least one scattering region comprises a plurality of discrete scattering regions that respectively extend on a subregion of a periphery of the core on subregions along the fiber axis.

5. The side-emitting step index fiber as claimed in claim 1, wherein the scattering centers are formed by scattering particles, the scattering particles comprising a material selected from the group consisting of $SiO_2$, SiN, BaO, MgO, ZnO, $Al_2O_3$, AlN, $TiO_2$, $ZrO_2$, $Y_2O_3$, metals of these oxides, BN, $B_2O_3$, Ru, Os, Rh, Ir, Ag, Au, Pd, Pt, diamond-like carbon, glass-ceramic particles, and any combinations thereof.

6. The side-emitting step index fiber as claimed in claim 1, wherein the scattering centers are formed by inhomogeneous regions of the glass of the at least one scattering region in which they are embedded.

7. The side-emitting step index fiber as claimed in claim 6, wherein the inhomogeneous regions are formed by phase separation and/or demixing of glass components of the glass of the at least one scattering region in which they are embedded.

8. The side-emitting step index fiber as claimed in claim 6, wherein the glass of the at least one scattering region in which the scattering centers are embedded is an As—Pb-containing silicate glass, and the inhomogeneous regions have an increased content of Pb and/or As by comparison with the glass.

9. The side-emitting step index fiber as claimed in claim 1, wherein the light-guiding core has a diameter of more than 0.4 mm, and the side-emitting step index fiber is a rigid light-guiding rod.

10. A method for producing a side-emitting step index fiber, comprising the steps of:
providing a core rod made from a glass with a first refractive index;
arranging an envelope tube made from a glass with a second refractive index such that the core rod is located within the envelope tube to form a preform;
heating the preform;
drawing out the preform to form a glass fiber or a light-guiding rod; and
in order to obtain the perform, arranging at least one inlay rod made from a glass with a third refractive index between the envelope tube and the core rod in a fashion substantially parallel to an axis of the core rod, scattering centers being embedded in the glass of the at least one inlay rod.

11. The method as claimed in claim 10, wherein, while drawing out the preform the at least one inlay rod fuses with the core rod so as to form a discrete scattering region that extends along the axis at least on a part of a periphery of the fiber core.

12. The method as claimed in claim 11, wherein the at least one inlay rod comprises a plurality of inlay rods that fuse as the preform is being drawn out both with the core rod and with one another so as to form at least one scattering region that encloses the entire periphery of the fiber core along the axis.

13. The side-emitting step index fiber as claimed in claim 1, further comprising a plastic tubing on the cladding, the plastic tubing being transparent and/or translucent at least in subregions.

14. A side-emitting step index fiber, comprising:
a light-guiding core made from a first glass with a first refractive index, the light-guiding core defining a fiber axis;
a cladding that is made from a second glass with a second refractive index, the cladding being transparent and/or translucent and enclosing the light-guiding core along the fiber axis;
at least one scattering region located between the light-guiding core and the cladding, the at least one scattering region being formed from a third glass having a third refractive index, wherein the third refractive index differs substantially from the second refractive index; and
scattering centers embedded in the third glass, wherein the third refractive index is at least equal to or greater than the first refractive index.

15. A side-emitting step index fiber comprising a light-guiding core made from glass with a first refractive index, and a transparent and/or translucent cladding that is made from glass with a second refractive index and encloses the core along a fiber axis, wherein located between core and cladding is at least one scattering region that is formed from a glass that has a third refractive index and in which there are embedded scattering centers, wherein the third refractive index differs substantially from the second refractive index, wherein the scattering centers are formed by inhomogeneous regions of the glass of the at least one scattering region in which they are embedded, and wherein the inhomogeneous regions are formed by phase separation and/or demixing of glass components of the glass of the at least one scattering region in which they are embedded.

16. A side-emitting step index fiber comprising a light-guiding core made from glass with a first refractive index, and a transparent and/or translucent cladding that is made from glass with a second refractive index and encloses the core along a fiber axis, wherein located between core and cladding is at least one scattering region that is formed from a glass that has a third refractive index and in which there are embedded scattering centers, wherein the third refractive index differs substantially from the second refractive index, wherein the scattering centers are formed by inhomogeneous regions of the glass of the at least one scattering region in which they are embedded, and wherein the glass of the at least one scattering region in which the scattering centers are embedded is an As—Pb-containing silicate glass, and the inhomogeneous regions have an increased content of Pb and/or As by comparison with the glass.

* * * * *